(12) United States Patent
Nogami et al.

(10) Patent No.: US 9,843,953 B2
(45) Date of Patent: Dec. 12, 2017

(54) TERMINAL DEVICE, BASE STATION DEVICE, COMMUNICATION SYSTEM, AND COMMUNICATION METHOD

(75) Inventors: Toshizo Nogami, Osaka (JP); Kazuyuki Shimezawa, Osaka (JP); Tatsushi Aiba, Osaka (JP); Lei Huang, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 493 days.

(21) Appl. No.: 13/704,353

(22) PCT Filed: Jun. 3, 2011

(86) PCT No.: PCT/JP2011/062806
§ 371 (c)(1),
(2), (4) Date: Dec. 14, 2012

(87) PCT Pub. No.: WO2011/158670
PCT Pub. Date: Dec. 22, 2011

(65) Prior Publication Data
US 2013/0094368 A1  Apr. 18, 2013

(30) Foreign Application Priority Data
Jun. 18, 2010 (JP) ................. 2010-139054

(51) Int. Cl.
*H04W 24/10* (2009.01)
*H04L 1/00* (2006.01)
(Continued)

(52) U.S. Cl.
CPC ........... *H04W 24/10* (2013.01); *H04L 1/0026* (2013.01); *H04L 1/0031* (2013.01);
(Continued)

(58) Field of Classification Search
None
See application file for complete search history.

(56) References Cited

U.S. PATENT DOCUMENTS

2009/0190528 A1   7/2009  Chung et al.
2009/0245169 A1  10/2009  Zhang et al.
(Continued)

FOREIGN PATENT DOCUMENTS

WO   2009/088225 A2   7/2009
WO   2009/119988 A1  10/2009
(Continued)

OTHER PUBLICATIONS

Official Communication issued in International Patent Application No. PCT/JP2011/062806, dated Aug. 16, 2011.
(Continued)

*Primary Examiner* — Yemane Mesfin
*Assistant Examiner* — Jeff Banthrongsack
(74) *Attorney, Agent, or Firm* — Keating & Bennett, LLP

(57) ABSTRACT

A terminal device includes communication means for carrying out communication with a base station device, and generation means for generating a rank indicator specifying a preferred rank, first partial precoder information and second partial precoder information specifying a preferred precoder, and a reception quality indicator specifying a preferred transmission rate. In a first feedback mode in which reception quality information is reported periodically to the base station device, the communication means reports the second partial precoder information and the reception quality indicator at first timing, and reports the rank indicator and the first partial precoder information at second timing different from the first timing. In a second feedback mode in which the reception quality information is reported aperiodically to the base station device, the communication means reports the rank indicator, the first partial precoder information, the second partial precoder information, and the reception quality indicator at the same timing.

16 Claims, 24 Drawing Sheets

(51) Int. Cl.
  *H04L 5/00* (2006.01)
  *H04L 25/03* (2006.01)
  *H04W 28/18* (2009.01)

(52) U.S. Cl.
  CPC .......... *H04L 1/0073* (2013.01); *H04L 5/0057* (2013.01); *H04L 5/006* (2013.01); *H04L 5/0023* (2013.01); *H04L 5/0048* (2013.01); *H04L 5/0053* (2013.01); *H04L 25/03343* (2013.01); *H04L 2025/03414* (2013.01); *H04L 2025/03426* (2013.01); *H04L 2025/03802* (2013.01); *H04W 28/18* (2013.01)

(56) References Cited

U.S. PATENT DOCUMENTS

| | | |
|---|---|---|
| 2009/0257384 A1 | 10/2009 | Lee et al. |
| 2009/0262854 A1* | 10/2009 | Lee .................. H04B 7/0417 375/267 |
| 2009/0316626 A1 | 12/2009 | Lee et al. |
| 2011/0103335 A1 | 5/2011 | Golitschek Edler von Elbwart et al. |
| 2012/0020288 A1* | 1/2012 | Liu .................... H04B 7/0417 370/328 |

FOREIGN PATENT DOCUMENTS

| | | |
|---|---|---|
| WO | 2009/125954 A1 | 10/2009 |
| WO | 2009/128604 A1 | 10/2009 |
| WO | 2009/135574 A1 | 11/2009 |
| WO | WO 2009135574 A1 * | 11/2009 |
| WO | 2009/157709 A2 | 12/2009 |

OTHER PUBLICATIONS

3rd Generation Partnership Project; Technical Specification Group Radio Access Network; Evolved Universal Terrestrial Radio Access (E-UTRA); Physical layer procedures (Release 8), Dec. 2008, 3GPP TS 36.213 V8.8.0 (Sep. 2009), 77pages.

* cited by examiner

FIG.6

| INDEX | MATRIX |
|---|---|
| 0 | $W^1_0$ |
| 1 | $W^1_1$ |
| 2 | $W^1_2$ |
| 3 | $W^1_3$ |

FIG.7

| INDEX | MATRIX |
|---|---|
| 0 | $W^2_0$ |
| 1 | $W^2_1$ |
| 2 | $W^2_2$ |
| 3 | $W^2_3$ |
| 4 | $W^2_4$ |
| ⋮ | ⋮ |
| 15 | $W^2_{15}$ |

FIG.13

| INDEX | RANK | PARTIAL PRECODER |
|---|---|---|
| 0 | 1 | $W^1_0$ |
| 1 | 1 | $W^1_1$ |
| 2 | 2 | $W^1_0$ |
| 3 | 2 | $W^1_1$ |
| 4 | 2 | $W^1_2$ |
| 5 | 2 | $W^1_3$ |
| 6 | 3 | $W^1_0$ |
| 7 | 3 | $W^1_1$ |
| 8 | 3 | $W^1_2$ |
| 9 | 3 | $W^1_3$ |
| 10 | 4 | $W^1_0$ |
| 11 | 4 | $W^1_1$ |
| 12 | 5 | $W^1_0$ |
| 13 | 6 | $W^1_0$ |
| 14 | 7 | $W^1_0$ |
| 15 | 8 | $W^1_0$ |

TERMINAL DEVICE, BASE STATION DEVICE, COMMUNICATION SYSTEM, AND COMMUNICATION METHOD

TECHNICAL FIELD

The present invention relates to a terminal device, a base station device, a communication system, and a communication method.

BACKGROUND ART

In a mobile radio communication system such as WCDMA (Wideband Code Division Multiple Access), LTE (Long Term Evolution), LTE-A (LTE-Advanced) and WiMAX (Worldwide Interoperability for Microwave Access) by 3GPP (Third Generation Partnership Project), the communication area can be increased by establishing a cellular configuration in which the area covered by a base station device (base station, transmission station, downlink transmission device, uplink reception device, eNodeB) or a transmission station conforming to the base station device is arranged as a plurality of cells. Furthermore, by using a frequency differing between adjacent cells or sectors, even a terminal device (mobile station, receiving station, uplink transmission device, downlink reception device, mobile terminal, UE: User Equipment) located in a cell edge region or a sector edge region can carry out communication without suffering interference by a transmitted signal from a plurality of base stations. However, such a scheme had the problem that the frequency usage efficiency is low. Although the frequency usage efficiency can be improved by using the same frequency between adjacent cells or sectors, measures against interference for the terminal device located in the cell edge region will be required.

By adaptively controlling a modulation and coding scheme (MCS), the number of spatial multiplex (number of layers, rank), precoder and the like according to the state of a transmission path between a base station and a terminal device, more efficient data transmission can be realized. Non-Patent Literature 1 discloses a method of performing such control.

FIG. 26 represents a base station 2601 and a terminal device 2602 adaptively controlling a precoder in LTE. When a precoder is adaptively controlled with respect to a downlink transmission signal 2603 that is transmitted in LTE, terminal device 2602 refers to a downlink reference signal (RS) included in downlink transmission signal 2603 that is transmitted from base station 2601 to calculate a rank indicator RI specifying a preferred number of spatial multiplex, a precoding matrix information PMI (Precoding Matrix Indicator) specifying a preferred precoder, and a channel quality indicator CQI specifying a preferred transmission rate, and reports to base station 2601 via an uplink channel 2604. Non-Patent Literature 1 teaches a feedback mode in which precoder information is reported periodically. A terminal device that is configured with a feedback mode in which the precoder information is reported uses a code book that is a table including a plurality of predetermined precoding matrixes to calculate and report to the base station a PMI that is an index corresponding to a preferred precoding matrix in the relevant code book.

CITATION LIST

Non Patent Literature

Non-Patent Literature 1: 3rd Generation Partnership Project; Technical Specification Group Radio Access Network; Evolved Universal Terrestrial Radio Access) E-UTRA); Physical layer procedures (Release 8), December 2008, 3GPP TS 36.213 V8.8.0 (2009-9).

SUMMARY OF INVENTION

Technical Problem

The conventional communication scheme is disadvantageous in that specification and application of a preferred precoder are difficult since information indicating a precoding matrix defined in only one code book could be reported. This was the cause of preventing the transmission efficiency from being improved.

In view of the foregoing, an object of the present invention is to provide a terminal device, a base station device, a communication system, and a communication method that can specify and apply precoder information efficiently using a plurality of partial precoder information.

Solution to Problem (1) The present invention is directed to solving the aforementioned problem. A terminal device according to an aspect of the present invention includes communication means for carrying out communication with a base station device, and generation means for generating a rank indicator specifying a preferred rank, first partial precoder information and second partial precoder information specifying a preferred precoder, and a reception quality indicator specifying a preferred transmission rate. In a first feedback mode in which reception quality information is reported periodically to the base station device, the communication means reports the second partial precoder information and the reception quality indicator at first timing, and reports the rank indicator and the first partial precoder information at second timing different from the first timing. In a second feedback mode in which the reception quality information is reported aperiodically to the base station device, the communication means reports the rank indicator, the first partial precoder information, the second partial precoder information, and the reception quality indicator at the same timing.

(2) Preferably, the communication means switches a unit of coding processing of the reception quality information, between the first feedback mode and the second feedback mode.

(3) Preferably, in the first feedback mode, the communication means jointly codes the second partial precoder information and the reception quality indicator, and jointly codes the rank indicator and the first partial precoder information.

(4) More preferably, in the second feedback mode, the communication means jointly codes the second partial precoder information and the reception quality indicator, and individually codes the rank indicator and the first partial precoder information.

(5) Preferably, in the first feedback mode, the communication means jointly codes the second partial precoder information and the reception quality indicator, and individually codes the rank indicator and the first partial precoder information.

(6) More preferably, in the second feedback mode, the communication means jointly codes the first partial precoder information, the second partial precoder information, and the reception quality indicator.

(7) Preferably, in the second feedback mode, the communication means rearranges the first partial precoder information and the second partial precoder information using different rearrangement algorisms.

(8) Preferably, in the second feedback mode, the communication means reports the first partial precoder information and the second partial precoder information in different numbers of spatial multiplex.

(9) A base station device according to another aspect of the present invention includes communication means for carrying out communication with a terminal device, and control means for configuring, for the terminal device, a first feedback mode in which reception quality information is reported periodically, or a second feedback mode in which the reception quality information is reported aperiodically, the reception quality information including a rank indicator specifying a preferred rank, first partial precoder information and second partial precoder information specifying a preferred precoder, and a reception quality indicator specifying a preferred transmission rate. In a case that the control means configures the first feedback mode, the control means configures, for the terminal device, first timing at which the second partial precoder information and the reception quality indicator are reported, and second timing which is different from the first timing and at which the rank indicator and the first partial precoder information are reported. In a case that the control means configures the second feedback mode, the control means allocates a resource for simultaneously reporting the rank indicator, the first partial precoder information, the second partial precoder information, and the reception quality indicator.

(10) Preferably, the base station device further includes acquisition means for acquiring information from the terminal device. In a case that the first feedback mode is configured, the acquisition means acquires the second partial precoder information and the reception quality indicator at the first timing, and acquires the rank indicator and the first partial precoder information at the second timing. In a case that the second feedback mode is configured, the acquisition means simultaneously acquires the rank indicator, the first partial precoder information, the second partial precoder information, and the reception quality indicator.

(11) More preferably, the control means switches a unit of decoding processing of the reception quality information, between the first feedback mode and the second feedback mode.

(12) A communication system according to still another aspect of the present invention includes a base station device, and a terminal device for carrying out communication with the base station device. The base station device includes control means for configuring, for the terminal device, a first feedback mode in which reception quality information is reported periodically, or a second feedback mode in which the reception quality information is reported aperiodically, the reception quality information including a rank indicator specifying a preferred rank, first partial precoder information and second partial precoder information specifying a preferred precoder, and a reception quality indicator specifying a preferred transmission rate. In a case that the control means configures the first feedback mode, the control means configures, for the terminal device, first timing at which the second partial precoder information and the reception quality indicator are reported, and second timing which is different from the first timing and at which the rank indicator and the first partial precoder information are reported. In a case that the control means configures the second feedback mode, the control means allocates a resource for simultaneously reporting the rank indicator, the first partial precoder information, the second partial pre-coder information, and the reception quality indicator. The terminal device is configured such that, in the first feedback mode, the terminal device reports the second partial precoder information and the reception quality indicator at the first timing, and reports the rank indicator and the first partial precoder information at the second timing, and, in the second feedback mode, the terminal device reports the rank indicator, the first partial precoder information, the second partial precoder information, and the reception quality indicator, using the resource.

(13) A communication method according to still another aspect of the present invention is a communication method in a terminal device for carrying out communication with a base station device. The communication method includes the steps of: generating a rank indicator specifying a preferred rank, first partial precoder information and second partial precoder information specifying a preferred precoder, and a reception quality indicator specifying a preferred transmission rate; reporting, in a first feedback mode in which reception quality information is reported periodically to the base station device, the second partial precoder information and the reception quality indicator at first timing, and the rank indicator and the first partial precoder information at second timing different from the first timing; and reporting, in a second feedback mode in which the reception quality information is reported aperiodically to the base station device, the rank indicator, the first partial precoder information, the second partial precoder information, and the reception quality indicator at the same timing.

(14) A communication method according to still another aspect of the present invention is a communication method in a base station device for carrying out communication with a terminal device. The communication method includes the steps of: configuring, for the terminal device, a first feedback mode in which reception quality information is reported periodically, or a second feedback mode in which the reception quality information is reported aperiodically, the reception quality information including a rank indicator specifying a preferred rank, first partial precoder information and second partial precoder information specifying a preferred precoder, and a reception quality indicator specifying a preferred transmission rate; configuring, in a case that the first feedback mode is configured, first timing at which the second partial precoder information and the reception quality indicator are reported, and second timing which is different from the first timing and at which the rank indicator and the first partial precoder information are reported, for the terminal device; and allocating, in a case that the second feedback mode is configured, a resource for simultaneously reporting the rank indicator, the first partial precoder information, the second partial precoder information, and the reception quality indicator.

Advantageous Effects of Invention

According to the present invention, precoder information can be specified and applied efficiently using a plurality of partial precoder information.

BRIEF DESCRIPTION OF DRAWINGS

FIG. 6 represents an exemplary code book of partial precoder information according to the first embodiment of the present invention.

FIG. 7 represents another exemplary code book of partial precoder information according to the first embodiment of the present invention.

FIG. 13 represents an exemplary table for specifying a combination of a rank and a partial precoder according to the first embodiment of the present invention.

DESCRIPTION OF EMBODIMENTS

Figure 1:
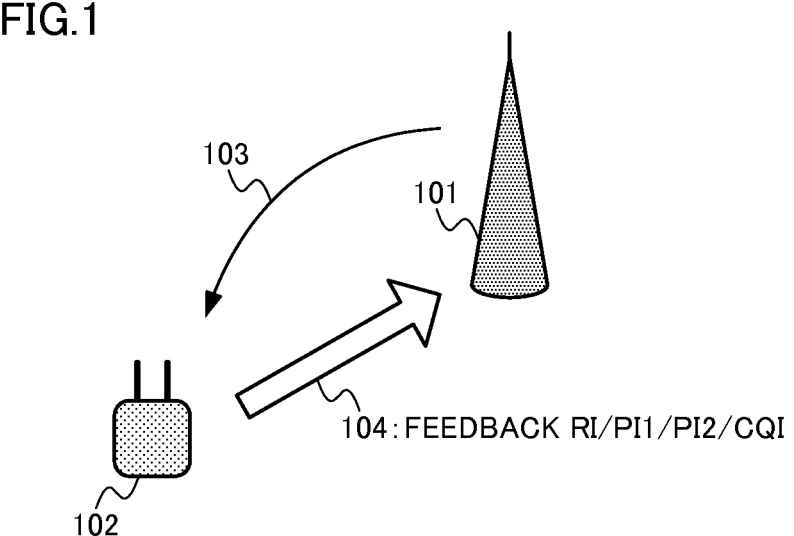
FIG. 1 is a schematic view of a configuration of a communication system according to a first embodiment of the present invention.

Embodiments of the present invention will be described in detail hereinafter with reference to the drawings. In the drawings, the same or corresponding elements have the same reference characters allotted, and description thereof will not be repeated.

First Embodiment

A first embodiment of the present invention will be described hereinafter with reference to the drawings.

FIG. 1 is a schematic view of a configuration of a communication system according to the first embodiment of the present invention. The communication system in this drawing envisages an LTE-A system, and includes a base station device (base station, transmission station, downlink transmission device, uplink reception device, eNodeB) 101 constituting a cell, and a terminal device (mobile station, receiving station, uplink transmission device, downlink reception device, mobile terminal, UE: User Equipment) 102. When a precoder is controlled adaptively with respect to a downlink transmission signal 103 that is to be transmitted, terminal device 102 refers to a downlink reference signal (RS) included in downlink transmission signal 103 transmitted from base station 101 to calculate a rank indicator RI specifying a preferred number of spatial multiplex, a plurality of partial precoder information PI specifying a preferred precoder, and a channel quality indicator CQI specifying a preferred transmission rate (modulation and coding scheme, length of a transport block, and the like), and reports respective information to base station 101 via an uplink channel 104. CQI corresponds to a reception quality indicator specifying a preferred transmission rate. Here, the case where partial precoder information 1 (PI1, first partial precoder information) and partial precoder information 2 (PI2, second partial precoder information) are reported as partial precoder information PI will be described. In the context of a preferred precoder, for example, it is possible to use a method of determining a precoder such that the reception signal power of the downlink is increased, taking the downlink propagation path into account.

Figure 2:
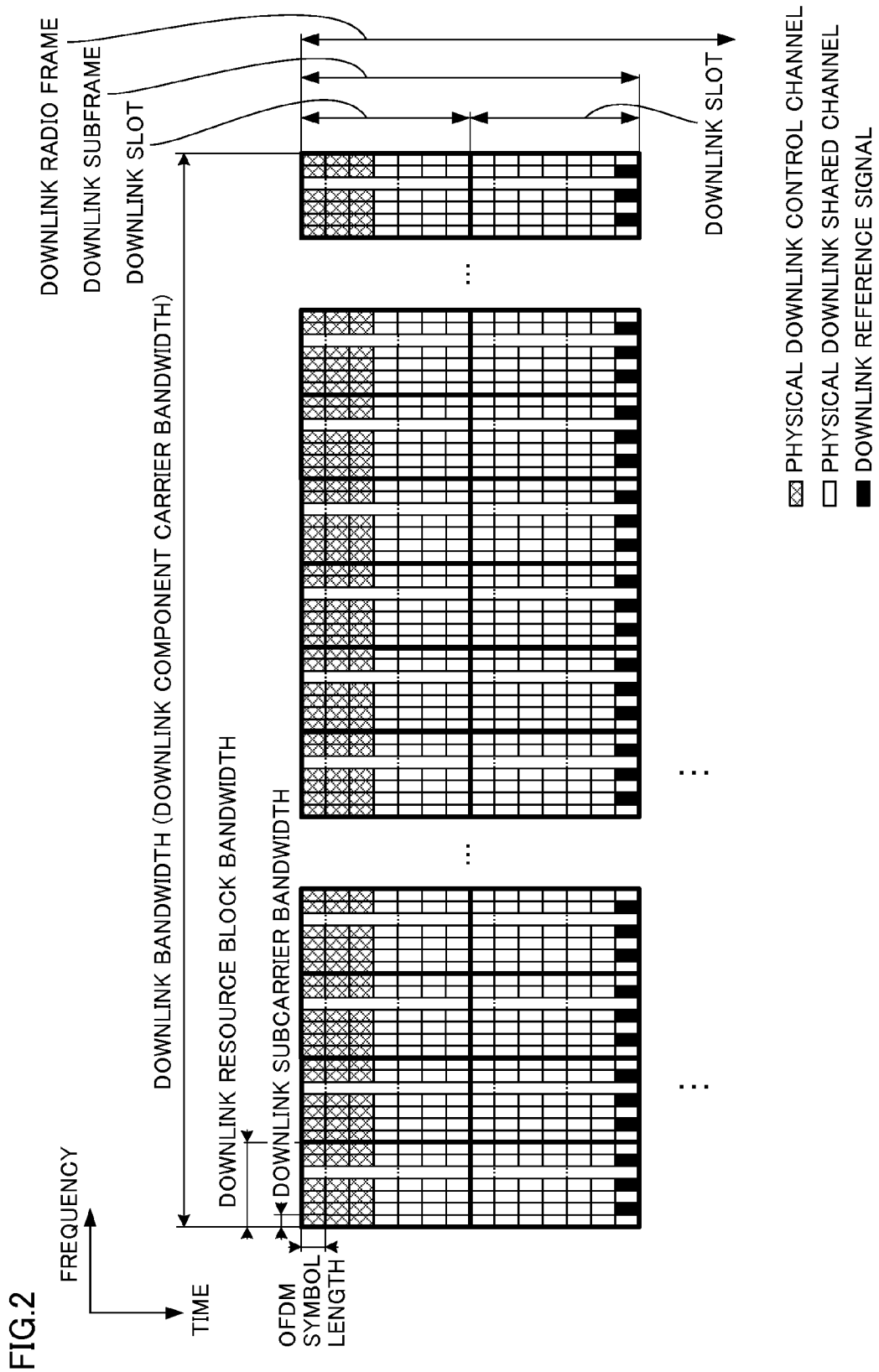
FIG. 2 represents an exemplary radio frame configuration of a downlink according to the first embodiment of the present invention.

FIG. 2 represents an exemplary radio frame configuration of a downlink according to the present embodiment. In the downlink, an OFDM (Orthogonal Frequency-Division Multiplex) access scheme is used. The downlink has a physical downlink control channel (PDCCH), a physical downlink shared channel (PDSCH), and the like assigned. A downlink reference signal (RS) is multiplexed on some of PDSCH. A downlink radio frame is constituted of a downlink resource block (RB) pair. The downlink RB pair is the unit of downlink radio resource allocation and the like, and is constituted of a frequency band (RB bandwidth) and a time zone (two slots=one subframe) of a predetermined width. One downlink RB pair is formed of two downlink RBs (RB bandwidth×slot) continuous in the time region. One downlink RB is formed of 12 subcarriers in the frequency region, and formed of 7 OFDM symbols in the time region. The physical downlink control channel is a physical channel for the transmission of downlink control information such as a terminal device identifier, scheduling information of a downlink shared channel, scheduling information of an uplink shared channel, a modulation and coding scheme, retransmission parameter, and the like.

Figure 3:
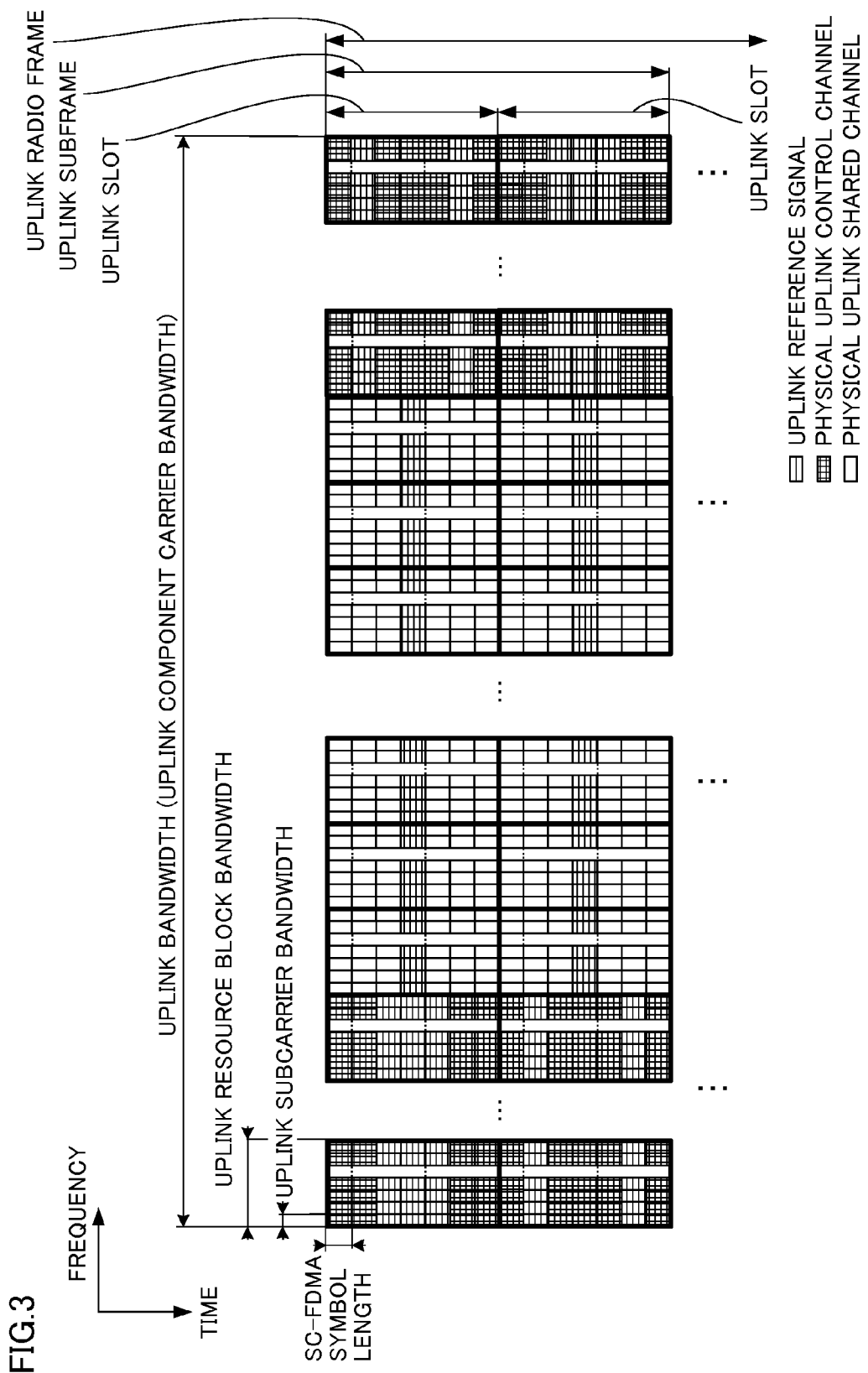
FIG. 3 represents an exemplary radio frame configuration of an uplink according to the first embodiment of the present invention.

FIG. 3 represents an exemplary radio frame configuration of an uplink according to the present embodiment. In the uplink, an SC-FDMA (Single Carrier-Frequency Division Multiple Access) scheme is used. The uplink has a physical uplink shared channel (PUSCH), a physical uplink control channel (PUCCH), and the like assigned. Furthermore, an uplink reference signal is allocated to some of PUSCH and PUCCH. An uplink radio frame is constituted of an uplink RB pair. The uplink RB pair is the unit of uplink radio resource allocation and the like, and is constituted of a frequency band (RB bandwidth) and a time zone (two slots=one subframe) of a predetermined width. One uplink RB pair is formed of two uplink RBs (RB bandwidth×slot) continuous in the time region. One uplink RB is formed of 12 subcarriers in the frequency region, and 7 SC-FDMA symbols in the time region.

Figure 4:
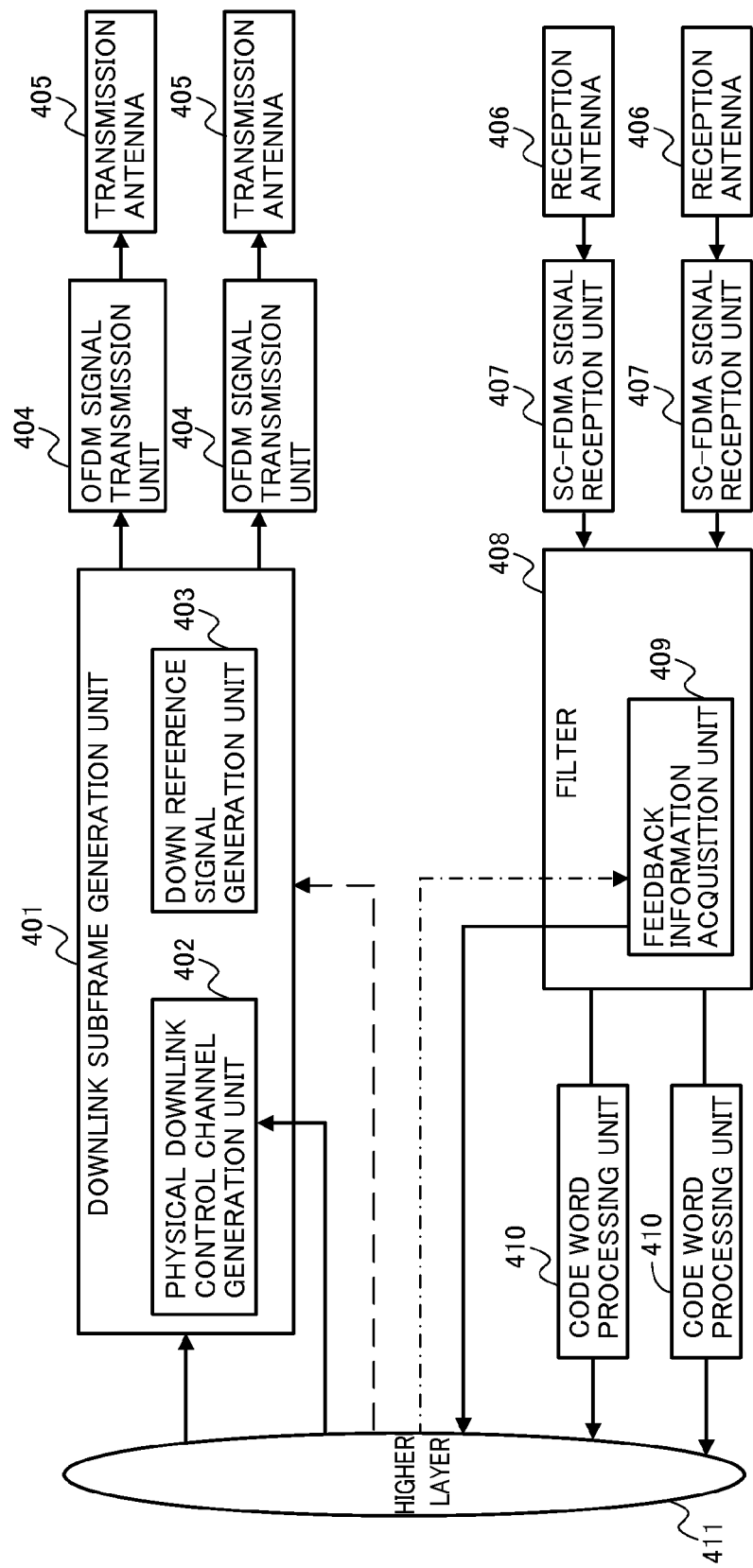
FIG. 4 is a schematic view showing an exemplary block configuration of a base station device according to the first embodiment of the present invention.

FIG. 4 is a schematic view showing an exemplary block configuration of the base station device according to the present embodiment. The base station device includes a downlink subframe generation unit 401, an OFDM signal transmission unit 404, a transmission antenna (base station transmission antenna) 405, a reception antenna (base station reception antenna) 406, an SC-FDMA signal reception unit 407, a filter 408, a code word processing unit 410, and a higher layer 411. Downlink subframe generation unit 401 includes a physical downlink control channel generation unit 402 and a downlink reference signal generation unit 403. Filter 408 includes a feedback information acquisition unit 409.

Figure 5:
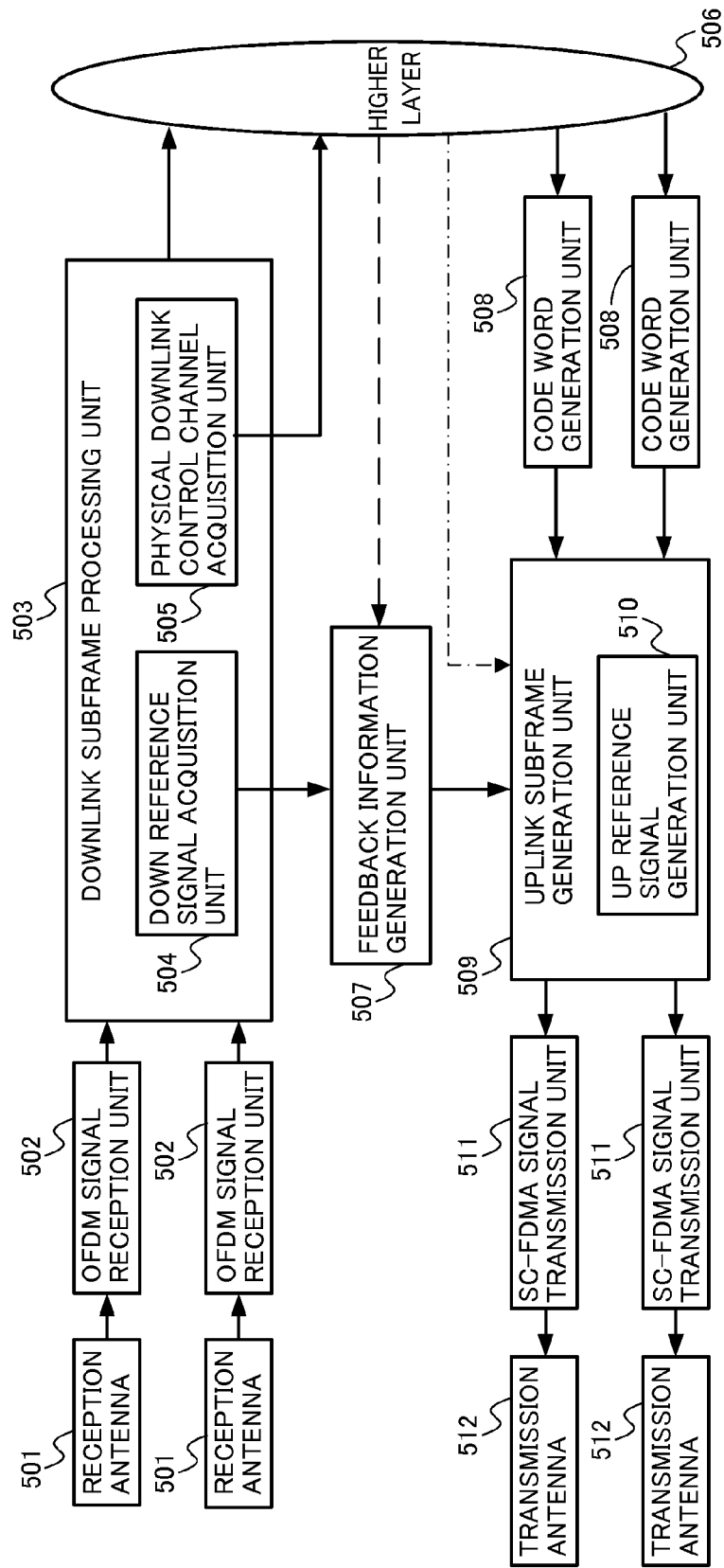
FIG. 5 is a schematic view showing an exemplary block configuration of a terminal device according to the first embodiment of the present invention.

FIG. 5 is a schematic view showing an exemplary block configuration of the terminal device according to the present embodiment. The terminal device includes a reception antenna (terminal reception antenna) 501, an OFDM signal reception unit 502, a downlink subframe processing unit 503, a higher layer 506, a feedback information generation unit 507, a code word generation unit 508, an uplink subframe generation unit 509, an SC-FDMA signal transmission unit 511, and a transmission antenna (terminal transmission antenna) 512. Downlink subframe processing unit 503 includes a downlink reference signal acquisition unit 504 and a physical downlink control channel acquisition unit 505. Uplink subframe generation unit 509 includes an uplink reference signal generation unit 510.

First, referring to FIGS. 4 and 5, a flow of transmission and reception in the downlink will be described. In the base station device, transmission data (also referred to as a transport block) for every code word (transmission data sequence in a physical layer) transmitted from higher layer 411 is converted into a modulation symbol sequence at downlink subframe generation unit 401, through error correction coding, rate matching processing, and modulation processing such as PSK (Phase Shift Keying) modulation or QAM (Quadrature Amplitude Modulation). The modulation symbol sequence is mapped to a resource element (RE) that is a mapping unit of the modulation symbol sequence, and is subjected to precoding processing by a precoder specified by the higher layer. RE in the downlink is defined corresponding to each subcarrier on each OFDM symbol. On this occasion, the transmission data sequence transmitted from higher layer 411 includes control data for RRC (Radio Resource Control) signaling. Further, at physical downlink control channel generation unit 402, the physical downlink control channel is generated in accordance with a designation from higher layer 411. Here, the control information included in the physical downlink control channel includes information such as a transmission parameter in the downlink, uplink resource allocation, a transmission parameter in the uplink, and a CQI request. Downlink reference signal generation unit 403 generates a downlink reference signal DLRS. Downlink subframe generation unit 401 maps the physical downlink control channel and DLRS to RE in a downlink subframe. The downlink subframe generated at downlink subframe generation unit 401 is modulated into an OFDM signal at OFDM signal transmission unit 404, and is transmitted via transmission antenna 405.

In the terminal device, the OFDM signal is received at OFDM signal reception unit 502 via reception antenna 501, and is subjected to OFDM demodulation processing. Downlink subframe processing unit 503 acquires reception data from the received downlink subframe, and transmits it to higher layer 506. More specifically, demodulation processing, rate matching processing, and error correction decoding corresponding to the modulation processing, rate matching processing, and error correction coding at downlink subframe generation unit 401, and the like are carried out. Downlink reference signal acquisition unit 504 acquires DLRS generated at downlink reference signal generation unit 403 and mapped at downlink subframe generation unit 401, and transmits it to feedback information generation unit 507. Physical downlink control channel acquisition unit 505 acquires the control information included in the physical downlink control channel generated at physical downlink control channel generation unit 402 and mapped at downlink subframe generation unit 401, and transmits it to higher layer 506.

Next, referring to FIGS. 4 and 5, a flow of transmission and reception in the uplink will be described. In the terminal device, transmission data (also referred to as a transport block) for every code word transmitted from higher layer 506 is converted into a code word CW at code word generation unit 508, through processing such as error correction coding and rate matching processing. Feedback information generation unit 507 generates feedback information by coding RI, PI1, PI2, CQI, and the like using DLRS acquired at downlink reference signal acquisition unit 504, in accordance with a designation from higher layer 506. Uplink reference signal generation unit 510 generates an uplink reference signal ULRS. Uplink subframe generation unit 509 rearranges a code word modulation symbol sequence and the feedback information by a predetermined method, and thereafter maps them to an uplink subframe, together with the uplink reference signal. SC-FDMA signal transmission unit 511 generates an SC-FDMA signal by performing SC-FDMA modulation on the uplink subframe, and transmits it via transmission antenna 512.

In the base station device, the SC-FDMA signal is received at SC-FDMA signal reception unit 407 via reception antenna 406, and is subjected to SC-FDMA demodulation processing. Filter 408 extracts the code word from the received uplink subframe, and transmits it to code word processing unit 410. Code word processing unit 410 acquires reception data from the code word, and transmits it to higher layer 411. More specifically, the reception data is acquired by carrying out rate matching processing and error correction decoding corresponding to the rate matching processing and error correction coding at code word generation unit 508, and the like. Feedback information acquisition unit 409 in filter 408 extracts and decodes the feedback information generated at feedback information generation unit 507 and mapped at downlink subframe generation unit 401, in accordance with a designation from the higher layer, and transmits it to higher layer 411. Here, filtering processing of filter 408 is carried out on a reception signal for every reception antenna 406 using methods such as ZF (Zero Forcing), MMSE (Minimum Mean Square Error), and MLD (Maximum Likelihood Detection) to detect a signal for every code word.

FIG. 6 represents an exemplary code book of partial precoder information according to the present embodiment. The size of this code book is 4. By specifying an index i that can be represented in 4 bits as PI1, $W^1_i$ corresponding to i can be determined in one-to-one correspondence.

FIG. 7 represents another exemplary code book according to the present embodiment. The size of this code book is 16. By specifying an index j that can be represented in 4 bits as PI2, $W^2_j$ corresponding to j can be determined in one-to-one correspondence.

A preferred precoder can be specified using $W^1_i$ indicated by PI1 and $W^2_j$ indicated by PI2. As a preferred precoder, a precoder such that the downlink reception signal power, downlink reception quality, and downlink transmission rate are increased can be employed, in consideration of the downlink propagation path, for example.

The code books shown in FIGS. 6 and 7 are merely examples and other code books may be employed. For example, a code book having a size differing from those of the code books shown in FIGS. 6 and 7 may be used. Further, although one type of code book is shown herein for each of $W^1_i$ and $W^2_j$, the present invention is not limited thereto. For example, a different code book can be used for every number of spatial multiplex (rank, number of layers). In this case, it is preferable to use code books in the number of layers indicated by RI reported immediately before.

The system is arranged such that a preferred precoder F is represented as F=A(i)B(j), assuming that i is reported as PI1 and j is reported as PI2. As used herein, F is a matrix having the size of the number of layers×the number of antenna ports. A and B are matrixes with a predetermined size. The matrix in the present specification may include the concept of both vector and scalar. As A and B, for example, an arbitrary matrix that can be determined in one-to-one correspondence by specifying i and j as set forth below can be used.

(1) It is assumed that $A(i)=W^1_i$, $B(j)=V_1+V_2W^2_j$, where $V_1$ and $V_2$ are each a predetermined matrix formed of the elements of 0 or 1, $W^1_i$ is a matrix specified by a predetermined code book, and $W^2_j$ is a scalar specified by a predetermined code book.

(2) It is assumed that $A(i)=W^1_i$, $B(j)=W^2_j$, where $W^1_i$ and $W^2_j$ are matrixes specified by a predetermined code book.

(3) It is assumed that $A(i)=[W^1_i W^1_i]$, $B(j)=W^2_j$, where $W^1_i$ and $W^2_j$ are matrixes specified by a predetermined code book.

Although the description has been provided based on the case where precoder F is specified by specifying $W^1_i$ and $W^2_j$ as partial precoders, A(i) and B(j) obtained from $W^1_i$ and $W^2_j$ by a predetermined operation may be referred to as partial precoders.

Figure 8:
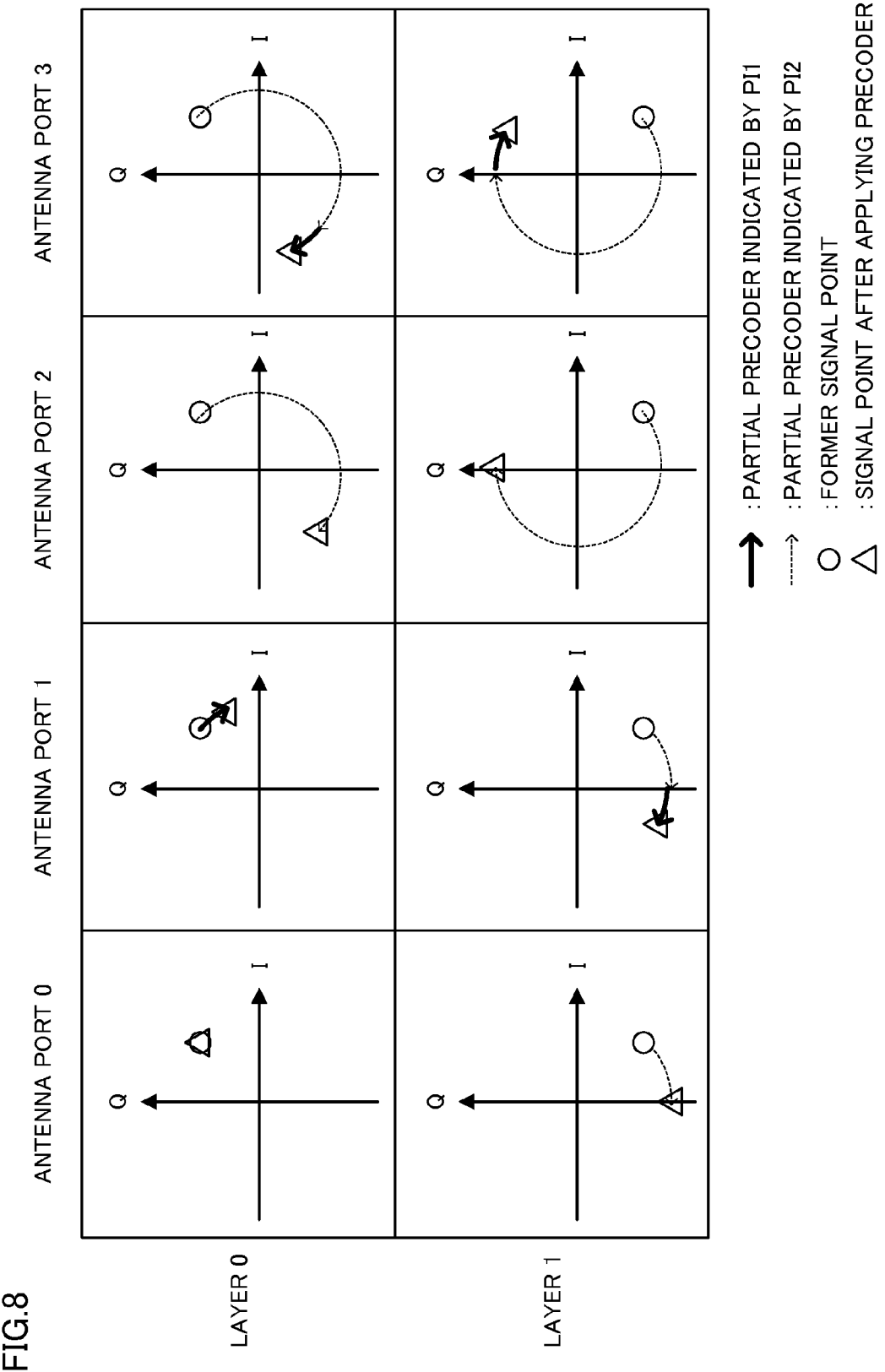
FIG. 8 schematically represents precoding processing according to the first embodiment of the present invention.
Figure 12:
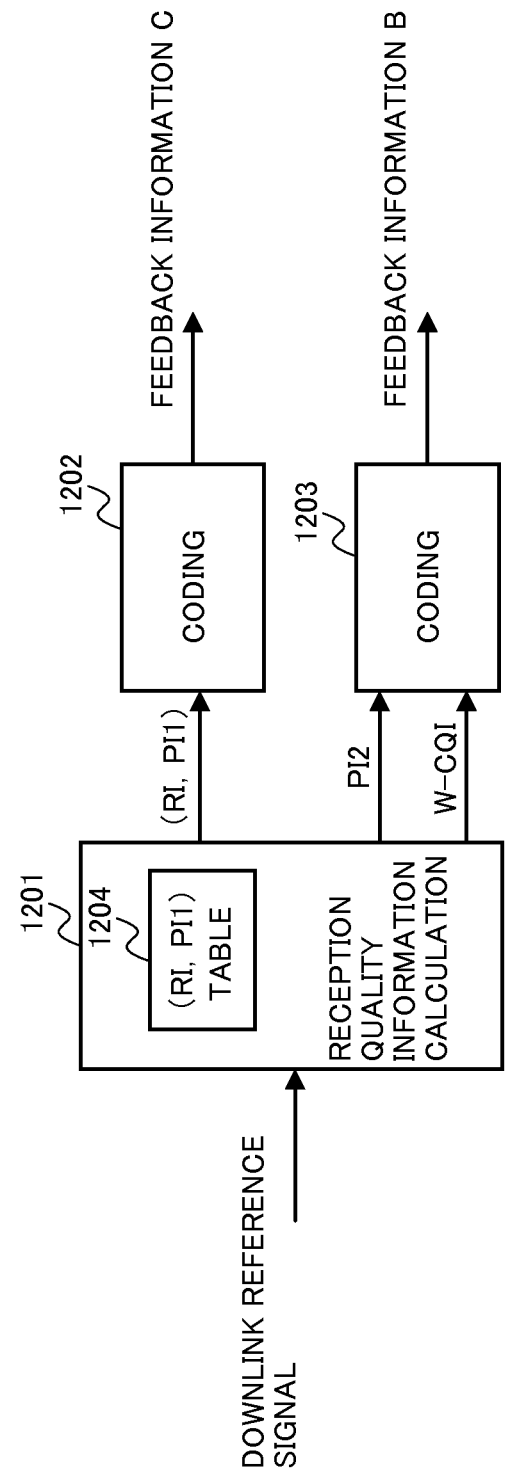
FIG. 12 represents another exemplary internal processing at the feedback information generation unit according to the first embodiment of the present invention.

FIG. 8 represents the concept of precoding processing according to the present embodiment. The description will be provided based on the case where the number of antenna ports is 4 and the number of layers is 2 for $F=W^1_iW^2_j$. The signal point at each antenna port in each layer is displaced (here, the phase rotates in the range from 0 to 2π) by $W^1_i$ that is the precoder represented by PI1, and the signal point at each antenna point in each layer is displaced (here, the phase rotates in the range from 0 to 2π) by $W^2_j$ that is the precoder represented by PI2. The displacement of the signal point shown in FIG. 12 is by way of example, and not limited thereto.

In reporting PI1, the terminal device determines a preferred precoder (a precoder that has a preferred signal point after the precoder is applied) from a code book corresponding to a group of precoders that apply a unique displacement to a signal point at each antenna port in each layer. Here, a code book as shown in FIG. 6 is used for determining PI1. Then, in reporting PI2, the terminal device further determines a precoder that has a preferred signal point after the precoder is applied, relative to the signal point after the precoder represented by the reported PI1 is applied, and reports that index as PI2. Here, a code book as shown in FIG. 7 is used for determining PI2. Alternatively, PI1 may be determined after PI2 is determined.

Further alternatively, the terminal device can determine PI1 and PI2 simultaneously. In this case, a precoder having $W^1_i$ and $W^2_j$ combined is evaluated for various combinations of PI1 and PI2 to determine a combination of PI1 and PI2 that represents a preferred precoder therefrom.

Thus, a preferred precoder that is expressed using PI1 and PI2 can also be represented as a coupled precoder based on a precoder expressed by PI1 and a precoder expressed by PI2. Although the description has been provided based on the case where the system is arranged to express such a coupled precoder as F=A(i)B(j), a similar advantage can be achieved by arranging a system with another precoder coupling method such as expressed by F=B(i)A(j) or F=K (A(i), B(j)). It is noted that K(X, Y) is an operator representing the Kronecker product of a matrix X and a matrix Y.

Figure 9:
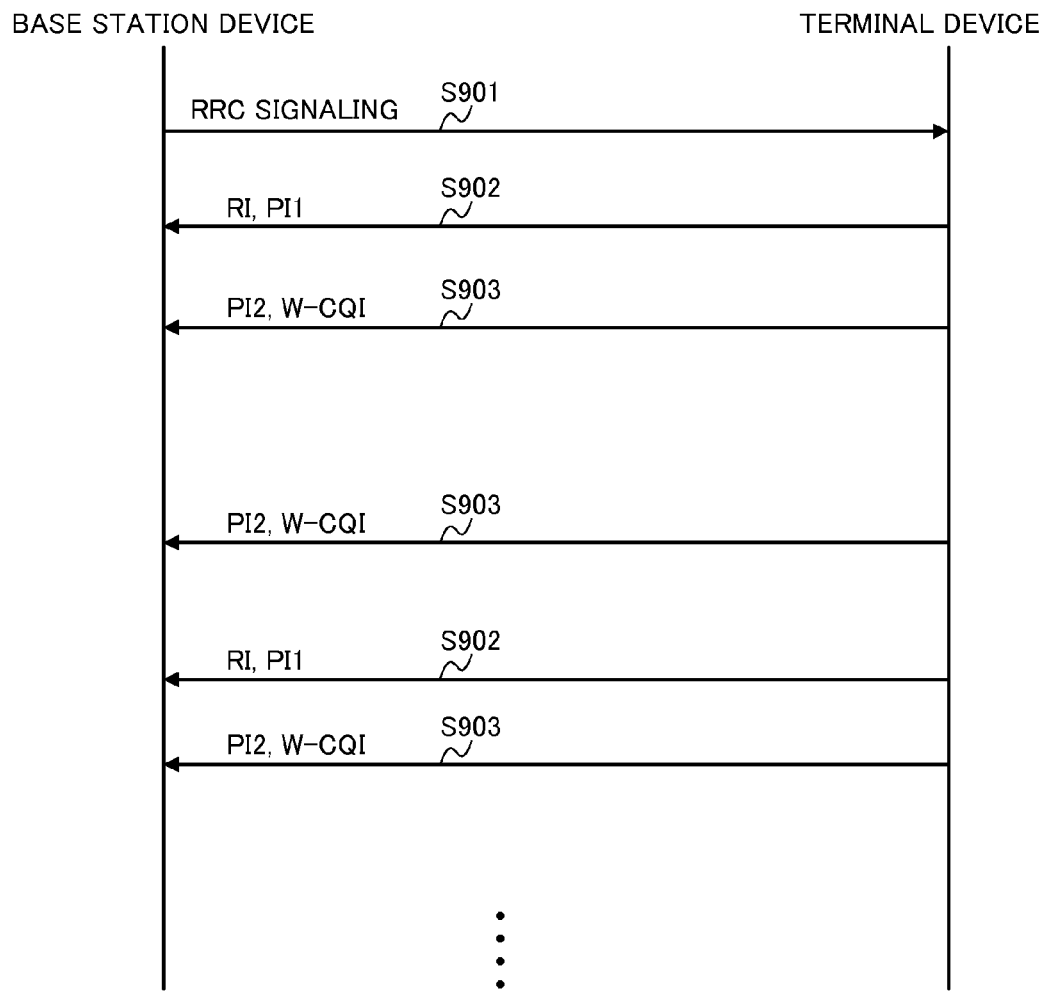
FIG. 9 represents an exemplary procedure according to the first embodiment of the present invention.

FIG. 9 represents an exemplary procedure according to the present embodiment. The procedure shown in FIG. 9 is an exemplary procedure in a periodic feedback mode (first feedback mode) in which RI, PI1, PI2, and a W-CQI (Wideband CQI) are fed back periodically. It is noted that W-CQI is one CQI representing a system bandwidth (component carrier bandwidth). In the present specification, a feedback mode includes a combination of contents of reception quality information to be fed back from the terminal device to the base station device, a method of measuring or generating respective contents, a method of feeding back respective contents, and setting of a resource and the like to be used for feedback.

First, the base station uses RRC signaling to configure a parameter for feedback in the terminal device, and designates periodic feedback (step S901). The terminal device having the periodic feedback designated reports to the base station device periodically RI and PI1 (step S902) and PI2 and W-CQI (step S903) according to the set parameter for feedback, via the physical uplink control channel. In the case of a feedback mode in which an S-CQI (Subband-CQI) is fed back periodically, the terminal device also reports S-CQI periodically. Here, S-CQI is a CQI representing a band BP (Bandwidth Part) obtained by dividing the system bandwidth (component carrier bandwidth) into a plurality of narrow bands. Although the description is herein provided based on the case where the setting of the parameter for feedback in the terminal device and designation of periodic feedback in step S901 are carried out using RRC signaling, the present invention is not limited thereto. A similar advantage can be achieved, for example, by using dynamic signaling via the physical downlink control channel or the like to carry out the setting of the parameter and/or designation of periodic feedback.

Figure 10:
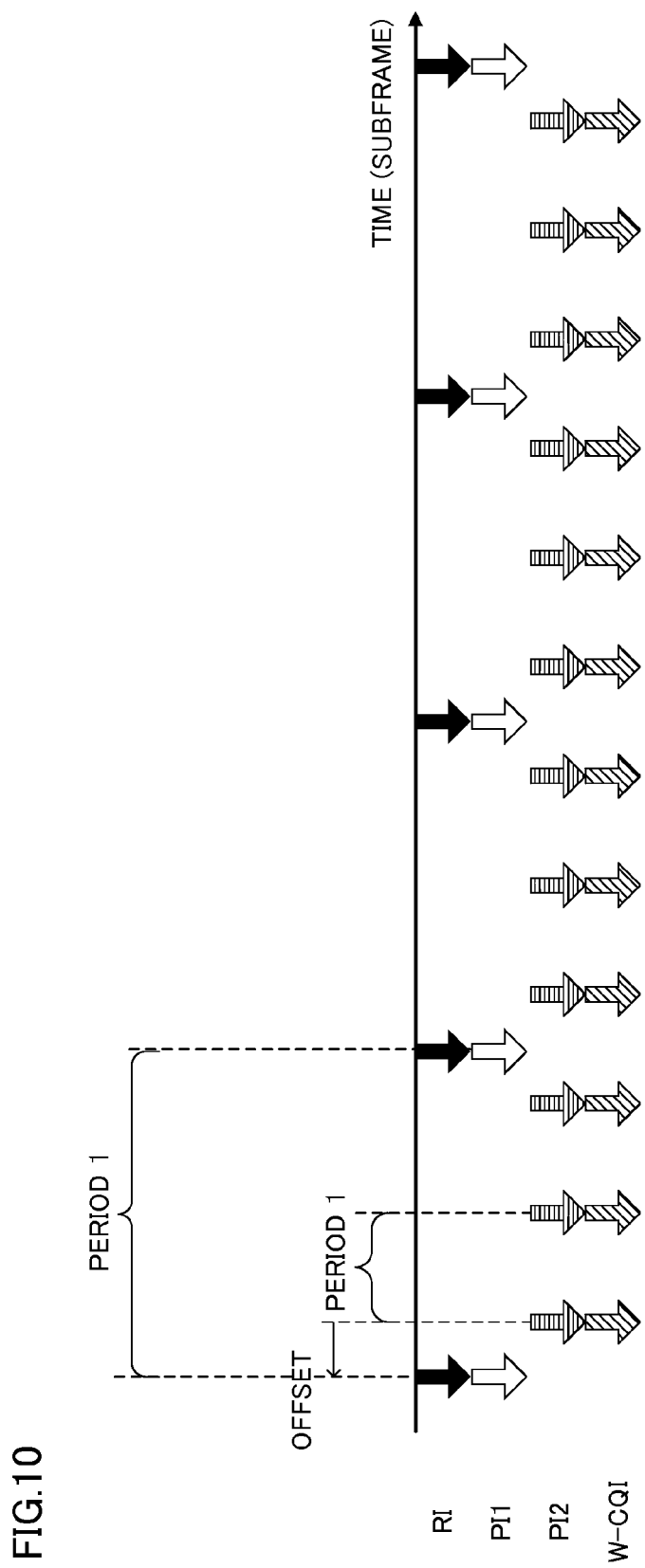
FIG. 10 represents an exemplary feedback mode according to the first embodiment of the present invention.

FIG. 10 represents an exemplary feedback mode according to the present embodiment. The feedback mode shown in FIG. 10 corresponds to the feedback mode by the procedure shown in FIG. 9. In this feedback mode, RI, PI1, PI2, and W-CQI are reported periodically. More specifically, W-CQI and PI2 are fed back in a subframe with a period 1 (first timing), and RI and PI1 are fed back in a subframe with a period 2 longer than period 1 (second timing). Further, the subframe in which RI and PI1 are reported (the second timing) is offset from the subframe in which W-CQI and PI2 are reported (the first timing), by a predetermined offset value. The base station device specifies parameters such as period 1, period 2, and the offset value, using the signaling in step S901 shown in FIG. 9. Thereby, the periodic resource of the physical uplink control channel can be configured for the terminal device.

Next, generation of feedback information (uplink control information) in the periodic feedback mode will be described.

Figure 11:
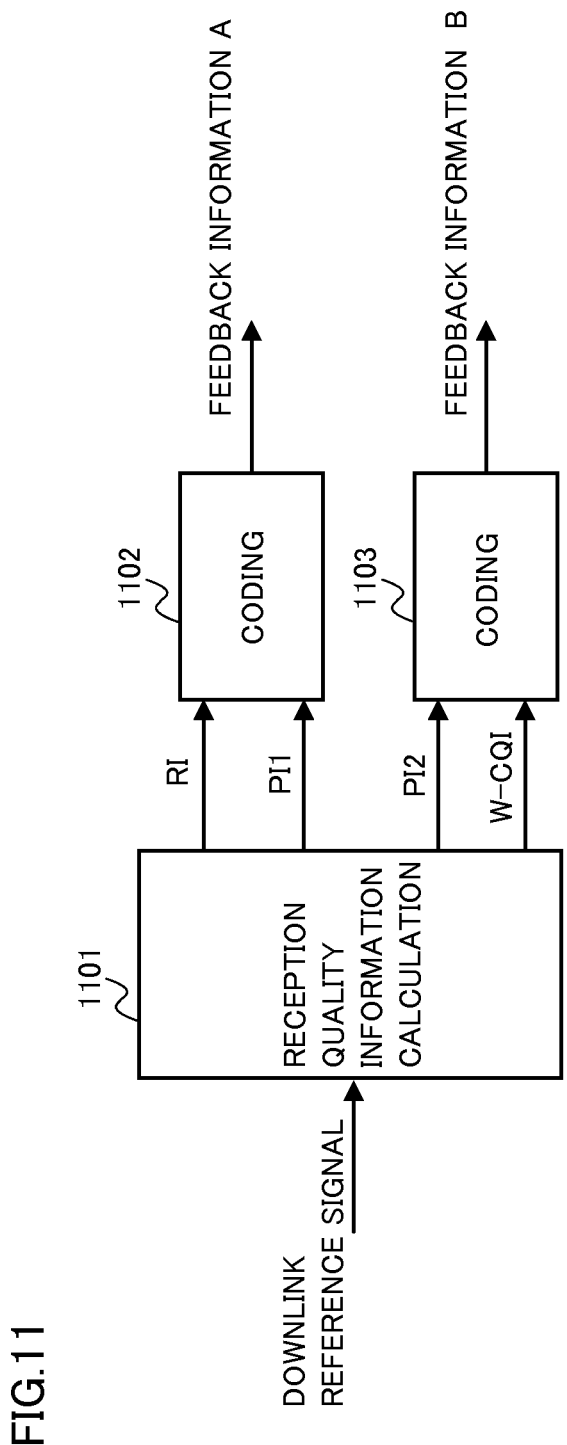
FIG. 11 represents exemplary internal processing at a feedback information generation unit according to the first embodiment of the present invention.

FIG. 11 represents exemplary internal processing (process) at feedback information generation unit 507 according to the present embodiment. The internal processing at feedback information generation unit 507 includes reception quality information calculation processing 1101 calculating RI, PI1, PI2, and W-CQI using the downlink reference signal, coding processing 1102 calculating feedback information A using RI and PI1, and coding processing 1103 calculating feedback information B using PI2 and W-CQI. Hereinafter, the description will be provided based on the case where RI has 3 bits, PI1 has 2 bits, PI2 has 4 bits, and W-CQI has 4 bits or 7 bits. Further, the description will be provided based on the case where the physical uplink control channel used to report general periodic feedback information has a capacity of 20 bits. The amounts of information and the capacity of the control channel used herein are merely examples and other values may obviously be employed.

In reception quality information calculation processing 1101, RI indicating a preferred rank (one of rank 1 to rank 8) at which a higher transmission rate is obtained while meeting predetermined quality is calculated from the downlink reference signal. Further, PI1 and PI2 are calculated by a method as described above. Furthermore, W-CQI is calculated, which indicates a preferred transmission rate at which a higher transmission rate is obtained while meeting predetermined quality when a precoder specified by calculated PI1 and PI2 is used. Here, if the number of code words transmitted in the downlink is 1, W-CQI indicating the transmission rate of the code word is represented in 4 bits. If the number of code words transmitted in the downlink is 2, an indicator indicating the transmission rate of one code word is represented in 4 bits, and an indicator indicating the transmission rate of the other code word is represented in 3 bits. Thus, W-CQI is represented in a total of 7 bits.

In coding processing 1102, first, 3 bits of RI and 2 bits of PI1 are coupled to generate a 5-bit sequence, and the coupled sequence is subjected to error correction coding to generate feedback information A as a 20-bit coded bit sequence. Similarly, in coding processing 1103, first, 4 bits of PI2 and 3 bits or 7 bits of W-CQI are coupled to generate a 7-bit or 11-bit sequence, and the coupled sequence is subjected to error correction coding to generate feedback information B as a 20-bit coded bit sequence.

Uplink subframe generation unit 509 receives specification of a subframe on which the feedback information by the periodic feedback mode is to be multiplexed, from higher layer 506. If the subframe is a subframe in which RI and PI1 are reported, uplink subframe generation unit 509 multiplexes feedback information A on the uplink subframe. If the subframe is a subframe in which PI2 and W-CQI are reported, uplink subframe generation unit 509 multiplexes feedback information B on the uplink subframe.

Feedback information acquisition unit 409 in the base station device receives specification of a subframe on which the feedback information by the periodic feedback mode is to be multiplexed, from higher layer 411. If the subframe is a subframe in which RI and PI1 are reported, feedback information acquisition unit 409 carries out decoding processing corresponding to coding processing 1102 to detect RI and PI1. If the subframe is a subframe in which PI2 and W-CQI are reported, feedback information acquisition unit 409 carries out decoding processing corresponding to coding processing 1103 to detect PI2 and W-CQI.

Thus, uplink subframe generation unit 509 in the terminal device, which is a portion of communication means for carrying out communication with the base station device, jointly codes RI and PI1, and jointly codes PI2 and W-CQI. Thereby, coding is completed within a subframe, and thus the base station device or the terminal device can carry out sequential processing for every subframe. Further, the amount of processing for every subframe can be reduced. Furthermore, the number of bits to be input for coding is more increased, and thus a large coding gain can be obtained.

FIG. 12 represents another exemplary internal processing at feedback information generation unit 507 according to the present embodiment. The internal processing at feedback information generation unit 507 includes reception quality information calculation processing 1201 calculating (RI, PI1) as a combination of RI and PI1, PI2, and W-CQI using the downlink reference signal, coding processing 1202 calculating feedback information C using (RI, PI1), and coding processing 1203 calculating feedback information B using PI2 and W-CQI. Further, reception quality information calculation processing 1201 refers to an (RI, PI1) table 1204. Coding processing 1203 may be the same as coding processing 1103 in FIG. 11.

FIG. 13 represents a table for specifying a combination of a rank and a partial precoder. The table is one example of (RI, PI1) table 1204 referred to in reception quality information calculation processing 1201. A rank and a partial precoder are specified corresponding to each index represented in 4 bits. The partial precoders used herein are the partial precoders included in the code book of FIG. 6. The resolution of the partial precoders (the number of the types of partial precoders that can be expressed) differs according to the rank. For example, at rank 2 or rank 3, four types of partial precoders can be specified as $W^1$, whereas at rank 5 or rank 8, one type of partial precoder is selected as $W^1$. It is noted that, as described above, a code book depending on the rank can be used instead of the code book of FIG. 6. In that case, a partial precoder in the right column of FIG. 13 may be selected from a different code book, depending on the rank in the middle column thereof.

In reception quality information calculation processing 1201, in calculating RI and PI1 from the downlink reference signal while meeting predetermined quality, one combination is selected from the combinations of RI and PI1 defined in the (RI, PI1) table. Further, PI2 and CQI are calculated by a method as described above.

In coding processing 1202, first, a 4-bit sequence indicating the combination of RI and PI1 is subjected to error correction coding to generate feedback information C as a 20-bit coded bit sequence. Although the description is herein provided based on the case where the number of bits less than 5 bits, which is the total number of bits required for RI and PI1, is used, the present invention is not limited thereto. The number of bits expressing a pattern of the combination of RI and PI1 may be the same as or more than the total number of bits expressing RI and PI1 respectively.

Uplink subframe generation unit 509 receives specification of a subframe on which the feedback information by the periodic feedback mode is to be multiplexed, from higher layer 506. If the subframe is a subframe in which RI and PI1 are reported, uplink subframe generation unit 509 multiplexes feedback information C on the uplink subframe. If the subframe is a subframe in which PI2 and W-CQI are reported, uplink subframe generation unit 509 multiplexes feedback information B on the uplink subframe.

Feedback information acquisition unit 409 in the base station device receives specification of a subframe on which the feedback information by the periodic feedback mode is to be multiplexed, from higher layer 411. If the subframe is a subframe in which RI and PI1 are reported, feedback information acquisition unit 409 carries out decoding processing corresponding to coding processing 1202 to detect RI and PI1. If the subframe is a subframe in which PI2 and W-CQI are reported, feedback information acquisition unit 409 carries out decoding processing corresponding to coding processing 1203 to detect PI2 and W-CQI.

Thus, uplink subframe generation unit 509 in the terminal device, which is a portion of the communication means for carrying out communication with the base station device, selects a combination of RI and PI1, and codes an indicator indicating the selected combination. Thereby, the amount of processing for every subframe can be reduced. Further, parameter setting with a higher degree of freedom, such as changing the resolution of the partial precoders depending on the rank, can be carried out.

Although the above description has been provided based on the case where the periodic feedback is carried out via the physical uplink control channel, the present invention is not limited thereto. For example, if the physical uplink shared channel is allocated in the same subframe as the subframe in which the periodic feedback is reported, the feedback information can be reported via the physical uplink shared channel. In this case, the same processing as that in an aperiodic feedback mode described later may be employed.

Figure 14:
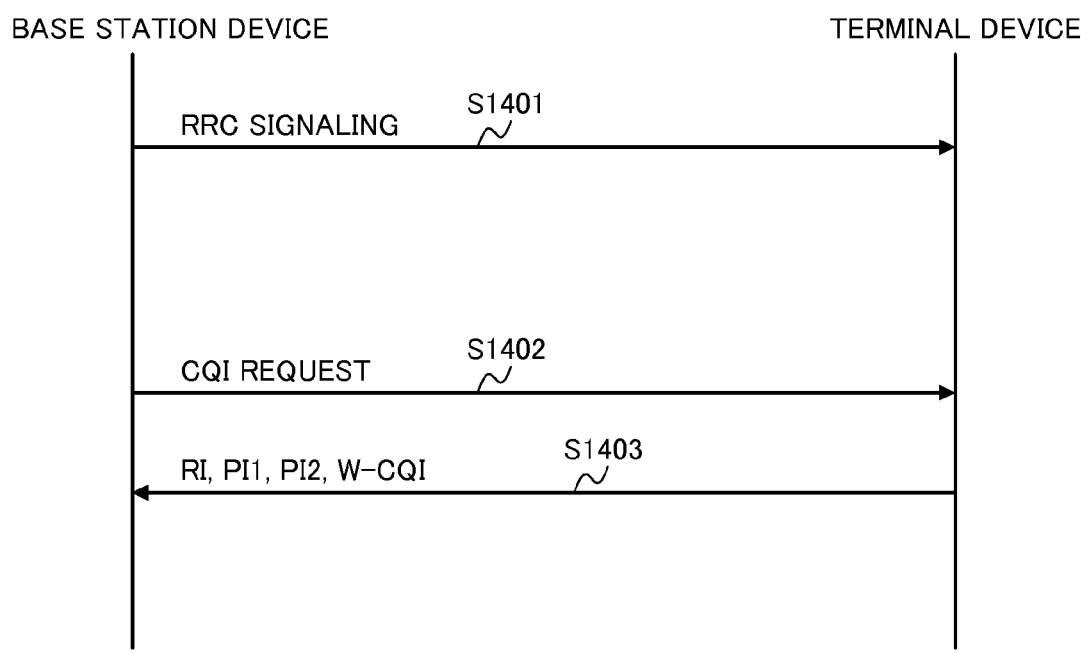
FIG. 14 schematically represents another exemplary procedure according to the first embodiment of the present invention.

FIG. 14 represents another exemplary procedure according to the present embodiment. The procedure shown in FIG. 14 is an exemplary procedure in an aperiodic feedback mode (second feedback mode) in which RI, PI1, PI2, and W-CQI are fed back aperiodically.

First, the base station uses RRC signaling to configure a parameter for feedback in the terminal device (step S1401). Then, the base station notifies the terminal device of CQI request, which is information designating aperiodic feedback (step S1402). Further, the base station allocates a resource (for example, the physical uplink shared channel) through which the feedback information is simultaneously reported. The terminal device having the aperiodic feedback designated reports RI, PI1, PI2, and W-CQI simultaneously (at the same timing) to the base station device, according to the set parameter for feedback, using the allocated resource (step S1403). In the case of an aperiodic feedback mode in which S-CQI is fed back, the terminal device also reports S-CQI simultaneously. Here, the terminal device simultaneously reports S-CQIs of a plurality of band BPs. Although the description is herein provided based on the case where the notification of CQI request in the terminal device in step S1402 is carried out using dynamic signaling via the physical downlink control channel, the present invention is not limited thereto. A similar advantage can be achieved, for example, by specifying the aperiodic feedback by quasi-static signaling using RRC signaling or the like. In this case, it is preferable to further specify a subframe for reporting.

Generation of feedback information (uplink control information) in the aperiodic feedback mode according to the present embodiment can be carried out using the same method as the method of generating the feedback information in the periodic feedback mode described above. More specifically, processing shown in FIGS. 11 and 12 is carried out as internal processing at feedback information generation unit 507. That is, uplink subframe generation unit 509 jointly codes RI and PI1, and jointly codes PI2 and W-CQI. However, the length of a coded bit sequence as an output of each coding processing may be different from the number of coded bits in the periodic feedback mode.

Uplink subframe generation unit 509 receives specification of a subframe on which the feedback information by the aperiodic feedback mode is to be multiplexed, from higher layer 506. In the specified subframe, uplink subframe generation unit 509 multiplexes feedback information A or feedback information C and feedback information B on the uplink subframe. Here, uplink subframe generation unit 509 performs rearrangement of a symbol sequence on feedback information A or feedback information C, feedback information B, and a CW0 as a code word in the uplink, and maps the rearranged symbol sequence to the physical uplink shared channel within the uplink subframe.

Figure 15:
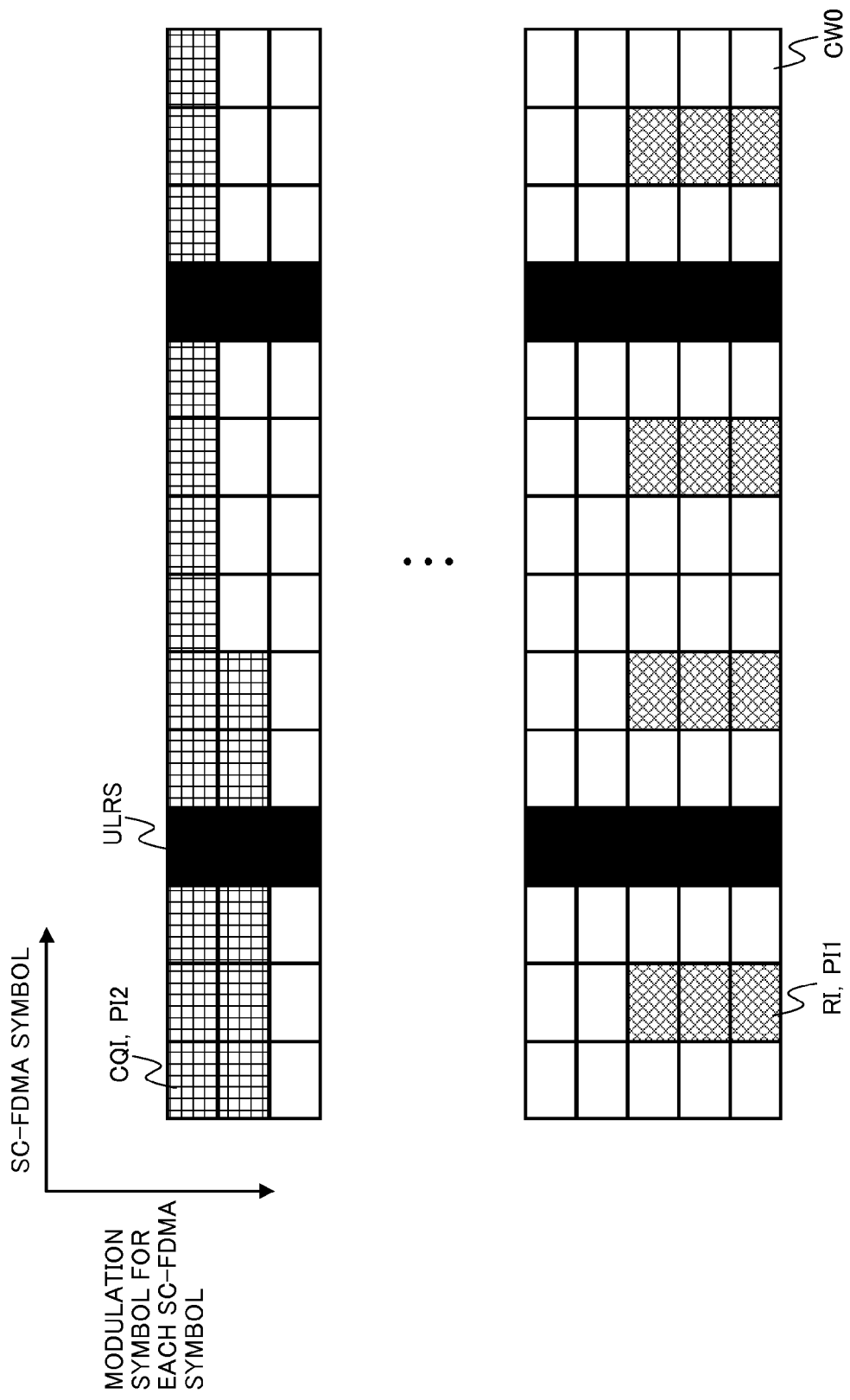
FIG. 15 represents exemplary rearrangement and mapping of a symbol sequence according to the first embodiment of the present invention.

FIG. 15 represents exemplary rearrangement and mapping of the symbol sequence according to the present embodiment. The rearrangement and mapping shown in FIG. 15 illustrate the case where one CW (CW0) is transmitted in the uplink. ULRS is mapped to the fourth and eleventh SC-FDMA symbols. Feedback information A or feedback information C having coded RI and PI1 and feedback information B having coded PI2 and CQI are rearranged as shown in FIG. 15.

More specifically, feedback information B is first coupled to CW0. On this occasion, they are coupled in the order of feedback information B and CW0. Thereafter, the coupled symbol sequence is rearranged, from the beginning of the sequence, to be sequentially mapped from the front of each SC-FDMA symbol, such as the front of the first SC-FDMA symbol, the front of the second SC-FDMA symbol, . . . , the front of the fourteenth SC-FDMA symbol, the second from the front of the first SC-FDMA symbol, . . . . Feedback information A or feedback information C is rearranged (interleaved) to be mapped to some or all of the SC-FDMA symbols close to ULRS (for example, the rear of the second, sixth, ninth, and thirteenth SC-FDMA symbols as shown in FIG. 15). That is, uplink subframe generation unit 509 in the terminal device, which is a portion of the communication means for carrying out communication with the base station device, rearranges PI1 and PI2 using different rearrangement algorisms (interleave algorisms). Here, it is preferable not to map the coupled symbol sequence to positions to which feedback information A or feedback information C is mapped. However, the coupled symbol sequence may be mapped to positions to which feedback information A or feedback information C is mapped. In this case, the coupled symbol sequence may be overwritten with feedback information C.

Figure 16:
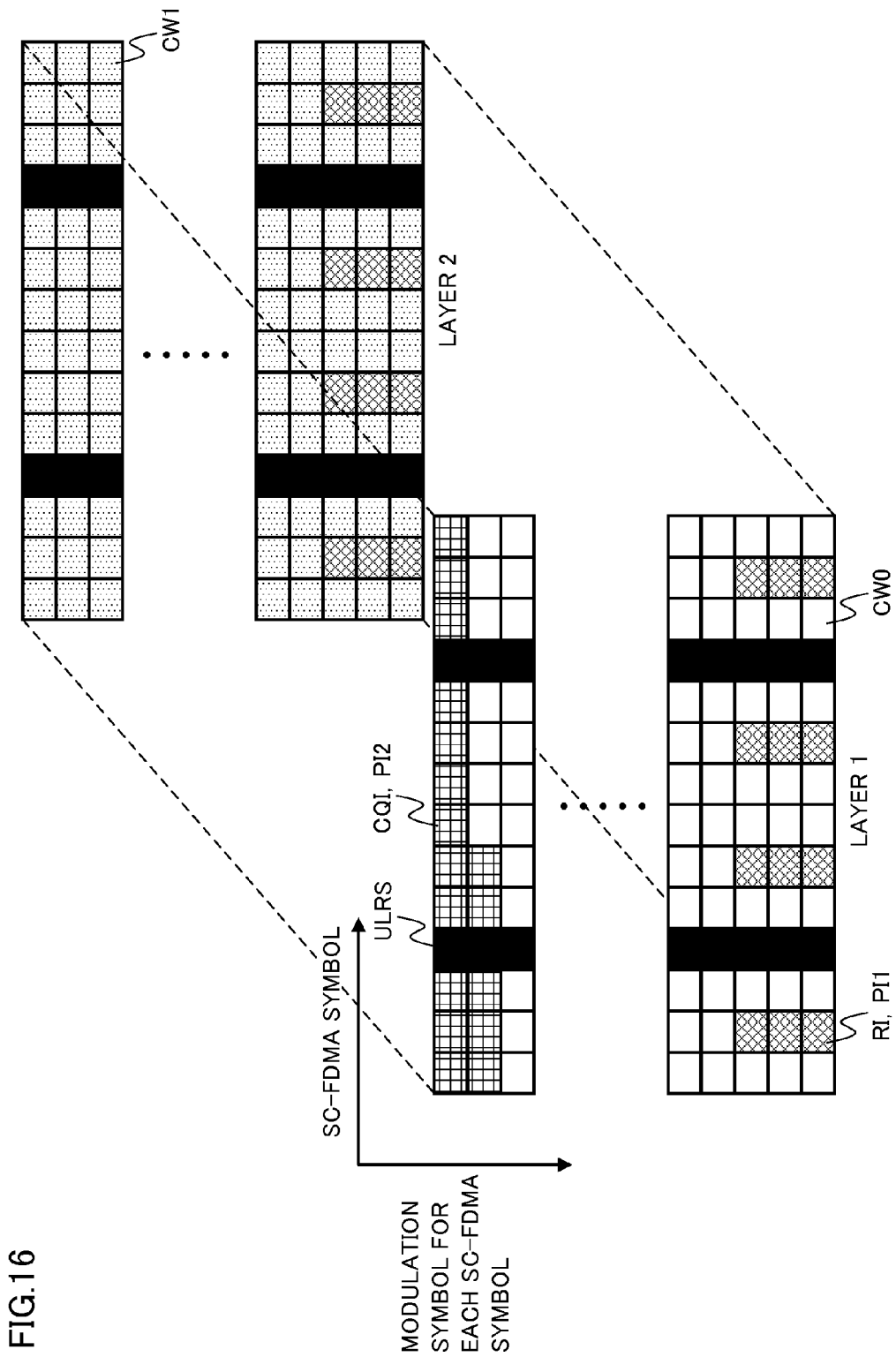
FIG. 16 represents another exemplary rearrangement and mapping of the symbol sequence according to the first embodiment of the present invention.

FIG. 16 represents another exemplary rearrangement and mapping of the symbol sequence according to the present embodiment. The rearrangement and mapping shown in FIG. 16 illustrate the case where a plurality of CWs (CW0 and CW1) are transmitted in the uplink. The description will be herein provided based on the case where CW0 and CW1 are transmitted using a layer 1 and a layer 2, respectively.

ULRS is mapped to the fourth and eleventh SC-FDMA symbols in each layer. Feedback information A or feedback information C having coded RI and PI1 and feedback information B having coded PI2 and CQI are rearranged as shown in FIG. 16.

More specifically, feedback information B is first coupled to CW0. On this occasion, they are coupled in the order of feedback information B and CW0. Thereafter, the coupled symbol sequence is rearranged, from the beginning of the sequence, to be sequentially mapped from the front of each SC-FDMA symbol in the layer in which CW0 is transmitted, such as the front of the first SC-FDMA symbol in layer 1, the front of the second SC-FDMA symbol in layer 1, . . . , the front of the fourteenth SC-FDMA symbol in layer 1, the second from the front of the first SC-FDMA symbol in layer 1, . . . . On the other hand, CW1 is rearranged, from the beginning of the sequence, to be sequentially mapped from the front of each SC-FDMA symbol in the layer in which CW1 is transmitted, such as the front of the first SC-FDMA symbol in layer 2, the front of the second SC-FDMA symbol in layer 2, . . . , the front of the fourteenth SC-FDMA symbol in layer 2, the second from the front of the first SC-FDMA symbol in layer 2, . . . . Feedback information A or feedback information C is rearranged to be mapped to some or all of the SC-FDMA symbols close to ULRS in every layer (for example, the rear of the second, sixth, ninth, and thirteenth SC-FDMA symbols in layers 1 and 2 as shown in FIG. 15). That is, uplink subframe generation unit 509 in the terminal device, which is a portion of the communication means for carrying out communication with the base station device, transmits (reports) PI1 and PI2 in different numbers of spatial multiplex.

These rearrangement processing and mapping processing are carried out at uplink subframe generation unit 509, under a designation from higher layer 506. On the other hand, feedback information acquisition unit 409 in the base station device carries out demapping corresponding to the mapping at uplink subframe generation unit 509 and rearrangement processing restoring the rearrangement at uplink subframe generation unit 509, under a designation from higher layer 411, to obtain feedback information A or feedback information C and feedback information B. Thereby, since the accuracy of detecting highly important information such as RI and PI1 can be enhanced, reception quality can be improved. Further, since the diversity effect of information having a large amount of information such as PI2 and CQI can be enhanced, reception quality can be improved.

As described above, in the first feedback mode (periodic feedback mode or mode performing feedback via the physical uplink control channel), the terminal device according to the present embodiment reports first feedback information (feedback information A or feedback information C) having jointly coded RI and PI1 and second feedback information (feedback information B) having jointly coded PI2 and CQI, in different subframes.

On the other hand, in the second feedback mode (aperiodic feedback mode or mode performing feedback via the physical uplink shared channel), the terminal device according to the present embodiment reports the first feedback information and the second feedback information, in the same subframe.

Further, in the second feedback mode, the terminal device according to the present embodiment rearranges the first feedback information such that the first feedback information is mapped to the SC-FDMA symbols located relatively close to ULRS. Thereby, coding is completed within a subframe, and thus the base station device or the terminal device can carry out sequential processing for every subframe. In addition, the amount of processing for every subframe can be reduced. Further, since the accuracy of detecting highly important information such as RI and PI1 can be enhanced, reception quality can be improved. Furthermore, since the diversity effect of information having a large amount of information such as PI2 and CQI can be enhanced, reception quality can be improved.

Second Embodiment

The first embodiment has been described based on the case where the terminal device reports the first feedback information having jointly coded RI and PI1 and the second feedback information having jointly coded PI2 and CQI. A second embodiment of the present invention will be described based on the case where the terminal device reports third feedback information having coded RI, fourth feedback information having coded PI1, and the second feedback information having jointly coded PI2 and CQI. The second embodiment of the present invention will be described hereinafter with reference to the drawings.

Block configurations of the base station device and the terminal device according to the present embodiment can be realized by the same block configurations as those shown in FIGS. 4 and 5, respectively. However, processing at feedback information generation unit 507, uplink subframe generation unit 509, and feedback information acquisition unit 409 partially differs from that in the first embodiment.

Figure 17:
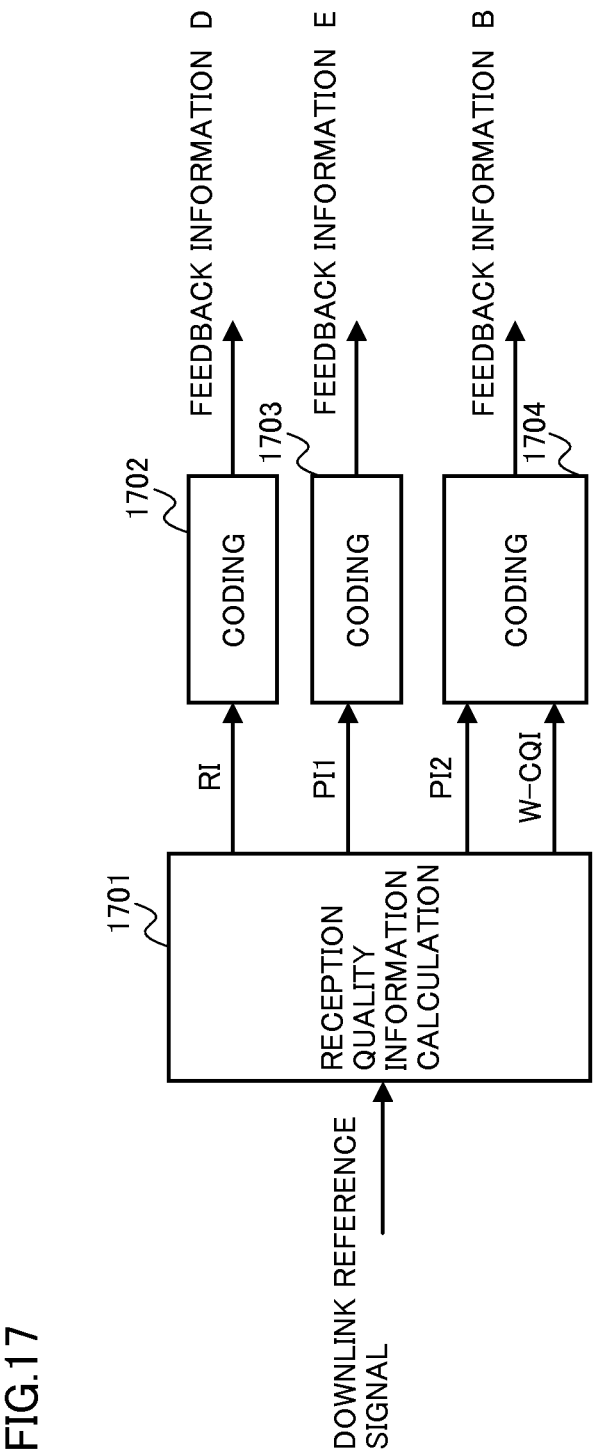
FIG. 17 represents exemplary internal processing at a feedback information generation unit according to a second embodiment of the present invention.

FIG. 17 represents exemplary internal processing (process) at feedback information generation unit 507 according to the present embodiment. This processing is the internal processing at feedback information generation unit 507 in the first feedback mode and the second feedback mode. The internal processing at feedback information generation unit 507 includes reception quality information calculation processing 1701 calculating RI, PI1, PI2, and W-CQI using the downlink reference signal, coding processing 1702 calculating feedback information D (the third feedback information) using RI, coding processing 1703 calculating feedback information E (the fourth feedback information) using PI1, and coding processing 1704 calculating feedback information B using PI2 and W-CQI. Here, reception quality information calculation processing 1701 and coding processing 1703 are identical to reception quality information calculation processing 1101 and coding processing 1103 in FIG. 11, respectively.

In coding processing 1702, 3 bits of RI are subjected to error correction coding to generate feedback information D as a 12-bit coded bit sequence. Similarly, in coding processing 1703, 2 bits of PI1 are subjected to error correction coding to generate feedback information E as an 8-bit coded bit sequence. That is, uplink subframe generation unit 509 individually codes RI and PI1.

In the periodic feedback mode, uplink subframe generation unit 509 receives specification of a subframe on which the feedback information by the periodic feedback mode is to be multiplexed, from higher layer 506. If the subframe is a subframe in which RI and PI1 are reported, uplink subframe generation unit 509 multiplexes a total of 20 bits of feedback information D and feedback information E on the uplink subframe. If the subframe is a subframe in which PI2 and W-CQI are reported, uplink subframe generation unit 509 multiplexes feedback information B on the uplink subframe.

Feedback information acquisition unit 409 in the base station device receives specification of a subframe on which the feedback information by the periodic feedback mode is to be multiplexed, from higher layer 411. If the subframe is a subframe in which RI and PI1 are reported, feedback information acquisition unit 409 carries out decoding processing corresponding to coding processing 1702 and coding processing 1703 to detect RI and PI1. If the subframe is a subframe in which PI2 and W-CQI are reported, feedback information acquisition unit 409 carries out decoding processing corresponding to coding processing 1704 to detect PI2 and W-CQI.

On the other hand, in the aperiodic feedback mode, uplink subframe generation unit 509 receives specification of a subframe on which the feedback information by the aperiodic feedback mode is to be multiplexed, from higher layer 506. If the subframe is a subframe in which the reception quality information is reported, feedback information acquisition unit 409 multiplexes feedback information D, feedback information E, and feedback information B on the uplink subframe.

Feedback information acquisition unit 409 in the base station device receives specification of a subframe on which the feedback information by the aperiodic feedback mode is to be multiplexed, from higher layer 411. If the subframe is a subframe in which the reception quality information is reported, feedback information acquisition unit 409 carries out decoding processing corresponding to coding processing 1702, coding processing 1703, and coding processing 1704 to detect RI, PI1, PI2, and W-CQI. However, the length of a coded bit sequence as an output of each coding processing may be different from the number of coded bits in the periodic feedback mode.

The above description has been provided based on the case where the third feedback information having coded RI, the fourth feedback information having coded PI1, and the second feedback information having jointly coded PI2 and CQI are reported in the first feedback mode and the second feedback mode. In addition to this, by each of feedback information generation unit 507, uplink subframe generation unit 509, and feedback information acquisition unit 409 carrying out, in the first feedback mode, the same processing as that in the first feedback mode according to the first embodiment, the third feedback information having coded RI, the fourth feedback information having coded PI1, and the second feedback information having jointly coded PI2 and CQI may be reported in the second feedback mode. Thereby, in the first feedback mode, reception quality can be improved while suppressing the amount of information, whereas in the second feedback mode, partial precoder information with a higher degree of freedom can be reported.

Figure 18:
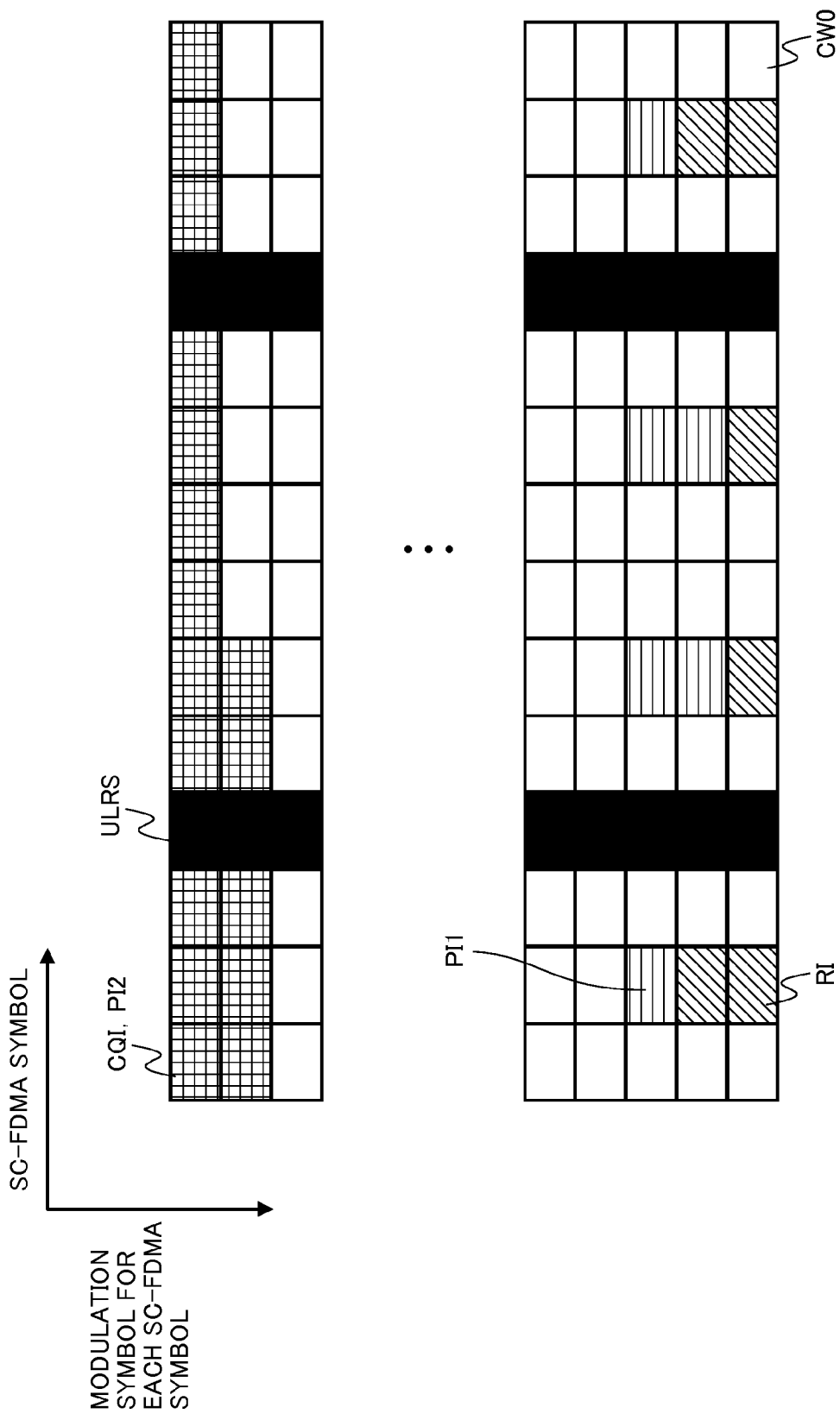
FIG. 18 represents exemplary rearrangement and mapping of a symbol sequence according to the second embodiment of the present invention.

FIG. 18 represents exemplary rearrangement and mapping of a symbol sequence according to the present embodiment. The rearrangement and mapping shown in FIG. 18 illustrate the case where one CW (CW0) is transmitted in the uplink in the second feedback mode. ULRS is mapped to the fourth and eleventh SC-FDMA symbols. Feedback information D having coded RI, feedback information E having coded PI1, and feedback information B having coded PI2 and CQI are rearranged as shown in FIG. 18.

More specifically, feedback information B is first coupled to CW0. On this occasion, they are coupled in the order of feedback information B and CW0. Thereafter, the coupled symbol sequence is rearranged, from the beginning of the sequence, to be sequentially mapped from the front of each SC-FDMA symbol. Feedback information D is rearranged to be mapped to some or all of the SC-FDMA symbols close to ULRS (for example, the rear of the second, sixth, ninth, and thirteenth SC-FDMA symbols as shown in FIG. 18). Similarly, feedback information E is rearranged to be mapped to some or all of the SC-FDMA symbols close to ULRS (for example, the front of RI in the second, sixth, ninth, and thirteenth SC-FDMA symbols as shown in FIG. 18, or the front of the third, fifth, tenth, and twelfth SC-FDMA symbols).

Figure 19:
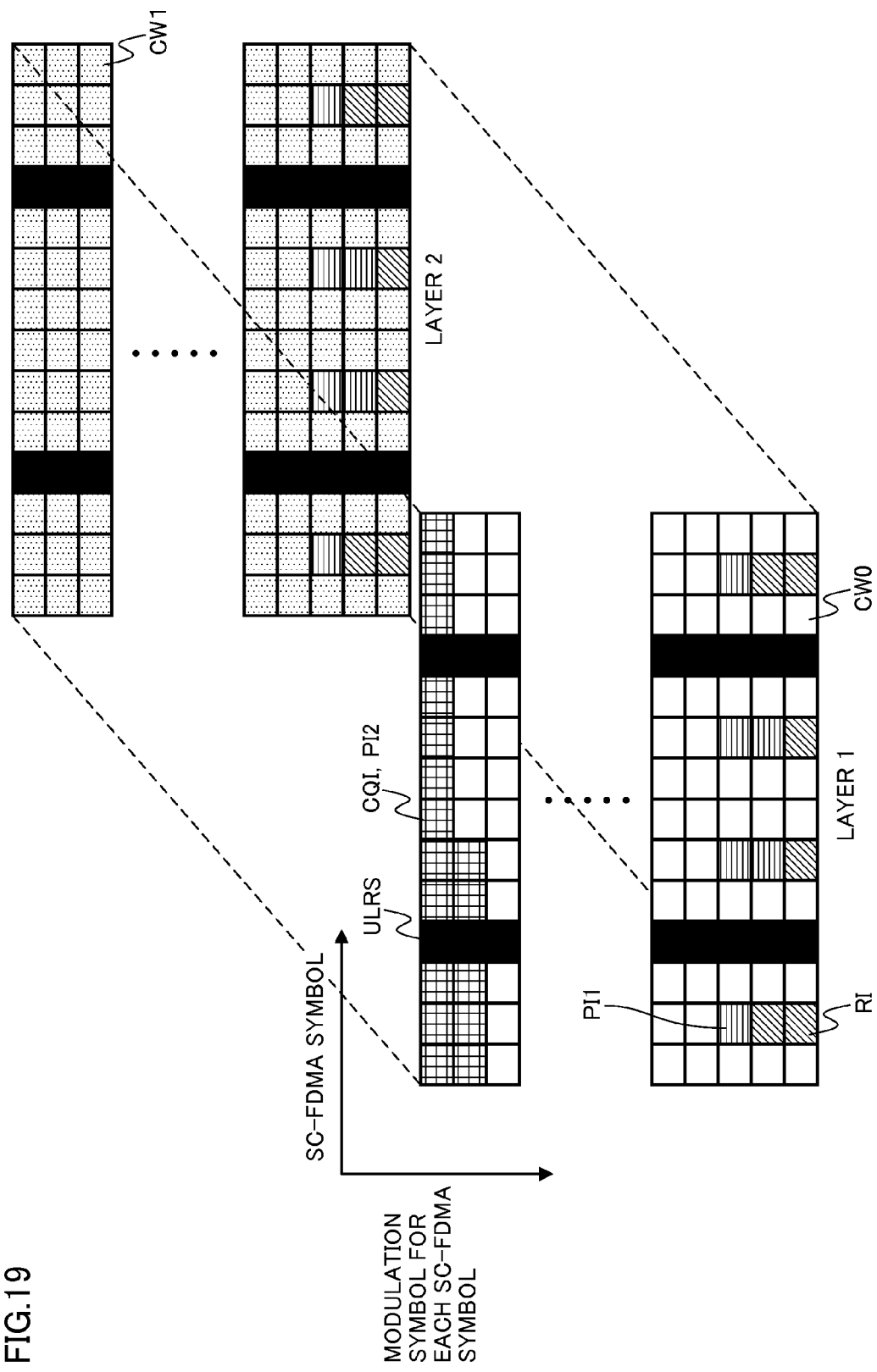
FIG. 19 represents another exemplary rearrangement and mapping of the symbol sequence according to the second embodiment of the present invention.

FIG. 19 represents another exemplary rearrangement and mapping of the symbol sequence according to the present embodiment. The rearrangement and mapping shown in FIG. 19 illustrate the case where the plurality of CWs (CW0 and CW1) are transmitted in the uplink in the second feedback mode. ULRS is mapped to the fourth and eleventh SC-FDMA symbols in each layer. Feedback information D, feedback information E, and feedback information B are rearranged as shown in FIG. 19.

More specifically, feedback information B is first coupled to CW0. On this occasion, they are coupled in the order of feedback information B and CW0. Thereafter, the coupled symbol sequence is rearranged, from the beginning of the sequence, to be sequentially mapped from the front of each SC-FDMA symbol in the layer in which CW0 is transmitted. On the other hand, CW1 is rearranged, from the beginning of the sequence, to be sequentially mapped from the front of each SC-FDMA symbol in the layer in which CW1 is transmitted. Feedback information D is rearranged to be mapped to some or all of the SC-FDMA symbols close to ULRS in every layer (for example, the rear of the second, sixth, ninth, and thirteenth SC-FDMA symbols in layers 1 and 2 as shown in FIG. 19). Similarly, feedback information E is rearranged to be mapped to some or all of the SC-FDMA symbols close to ULRS in every layer (for example, the front of RI in the second, sixth, ninth, and thirteenth SC-FDMA symbols in layers 1 and 2 as shown in FIG. 19).

Figure 20:
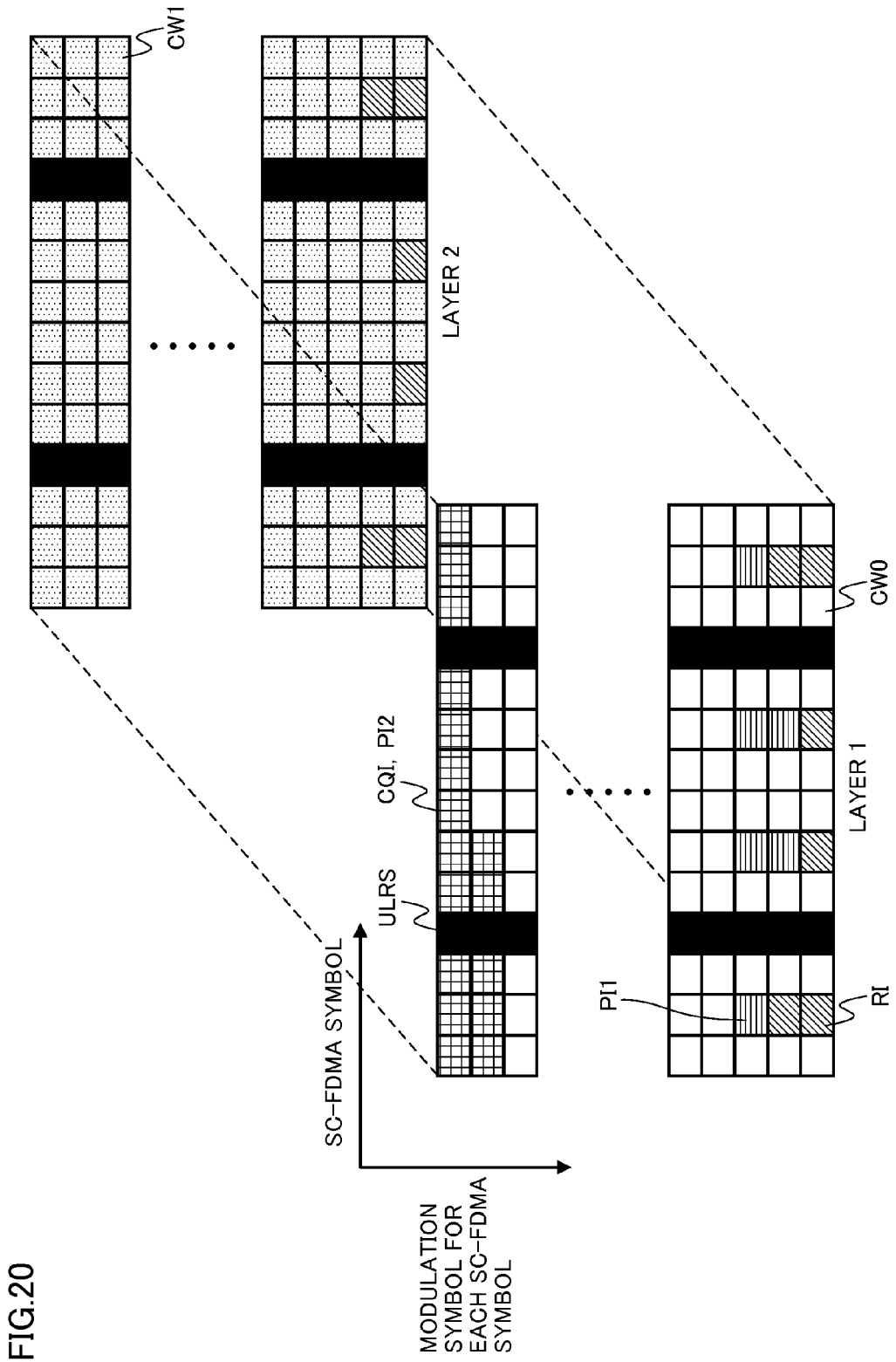
FIG. 20 represents another exemplary rearrangement and mapping of the symbol sequence according to the second embodiment of the present invention.

FIG. 20 represents still another exemplary rearrangement and mapping of the symbol sequence according to the present embodiment. The rearrangement and mapping shown in FIG. 20 illustrate another case where the plurality of CWs (CW0 and CW1) are transmitted in the uplink in the second feedback mode. ULRS is mapped to the fourth and eleventh SC-FDMA symbols in each layer. Feedback information D, feedback information E, and feedback information B are rearranged as shown in FIG. 20.

More specifically, feedback information B is first coupled to CW0. On this occasion, they are coupled in the order of feedback information B and CW0. Thereafter, the coupled symbol sequence is rearranged, from the beginning of the sequence, to be sequentially mapped from the front of each SC-FDMA symbol in the layer in which CW0 is transmitted. On the other hand, CW1 is rearranged, from the beginning of the sequence, to be sequentially mapped from the front of each SC-FDMA symbol in the layer in which CW1 is transmitted. Feedback information D is rearranged to be mapped to some or all of the SC-FDMA symbols close to ULRS in every layer (for example, the rear of the second, sixth, ninth, and thirteenth SC-FDMA symbols in layers 1 and 2 as shown in FIG. 20). On the other hand, feedback information E is rearranged to be mapped to some or all of the SC-FDMA symbols close to ULRS in the layer in which CW0 is transmitted (for example, the front of RI in the second, sixth, ninth, and thirteenth SC-FDMA symbols in layer 1 as shown in FIG. 20). Alternatively, feedback information E may be rearranged to be mapped to some or all of the SC-FDMA symbols close to ULRS in the layer in which CW1 is transmitted (layer in which CW that is not CW to be coupled to CQI is transmitted). This can prevent an excessive decrease in the number of bits of CW0.

These rearrangement processing and mapping processing are carried out at uplink subframe generation unit 509, under a designation from higher layer 506. On the other hand, feedback information acquisition unit 409 in the base station device carries out demapping corresponding to the mapping at uplink subframe generation unit 509 and rearrangement processing restoring the rearrangement at uplink subframe generation unit 509, under a designation from higher layer 411, to obtain feedback information D, feedback information E, and feedback information B. Thereby, since the accuracy of detecting highly important information such as RI and PI1 can be enhanced, reception quality can be improved. Further, since the diversity effect of information having a large amount of information such as PI2 and CQI can be enhanced, reception quality can be improved.

Here, it is preferable not to map the coupled symbol sequence to positions to which feedback information D or feedback information E is mapped. However, the coupled symbol sequence may be mapped to positions to which one (for example, feedback information E) or both of feedback information D and feedback information E are mapped. In this case, the coupled symbol sequence may be overwritten with one (for example, feedback information E) or both of feedback information D and feedback information E.

As described above, in the first feedback mode (periodic feedback mode or mode performing feedback via the physical uplink control channel), the terminal device according to the present embodiment reports a set of the fourth feedback information (feedback information D) having coded RI and the fifth feedback information (feedback information E) having coded PI1, and the second feedback information (feedback information B) having jointly coded PI2 and CQI, in different subframes. Alternatively, the terminal device according to the present embodiment reports the first feedback information (feedback information A or feedback information C) having jointly coded RI and PI1 and the second feedback information (feedback information B) having jointly coded PI2 and CQI, in different subframes.

On the other hand, in the second feedback mode (aperiodic feedback mode or mode performing feedback via the physical uplink shared channel), the terminal device according to the present embodiment reports the fourth feedback information, the fifth feedback information, and the second feedback information, in the same subframe. Further, in the second feedback mode, the terminal device according to the present embodiment rearranges the fourth feedback information and the fifth feedback information such that these pieces of feedback information are mapped to the SC-FDMA symbols located relatively close to ULRS. Thereby, coding is completed within a subframe, and thus the base station device or the terminal device can carry out sequential processing for every subframe. In addition, the amount of processing for every subframe can be reduced. Further, since the accuracy of detecting highly important information such as RI and PI1 can be enhanced, reception quality can be improved. Furthermore, since the diversity effect of information having a large amount of information such as PI2 and CQI can be enhanced, reception quality can be improved.

Third Embodiment

The first embodiment has been described based on the case where the terminal device reports the first feedback information having jointly coded RI and PI1 and the second feedback information having jointly coded PI2 and CQI. A third embodiment of the present invention will be described based on the case where the terminal device reports the third feedback information having coded RI and sixth feedback information having jointly coded PI1, PI2, and CQI in the second feedback mode. The third embodiment of the present invention will be described hereinafter with reference to the drawings.

Block configurations of the base station device and the terminal device according to the present embodiment can be realized by the same block configurations as those shown in FIGS. 4 and 5, respectively. However, processing at feedback information generation unit 507, uplink subframe generation unit 509, and feedback information acquisition unit 409 partially differs from that in the first embodiment.

In the first feedback mode according to the present embodiment, each of feedback information generation unit 507, uplink subframe generation unit 509, and feedback information acquisition unit 409 carries out the same processing as that in the first feedback mode according to the first embodiment or the second embodiment.

Figure 21:
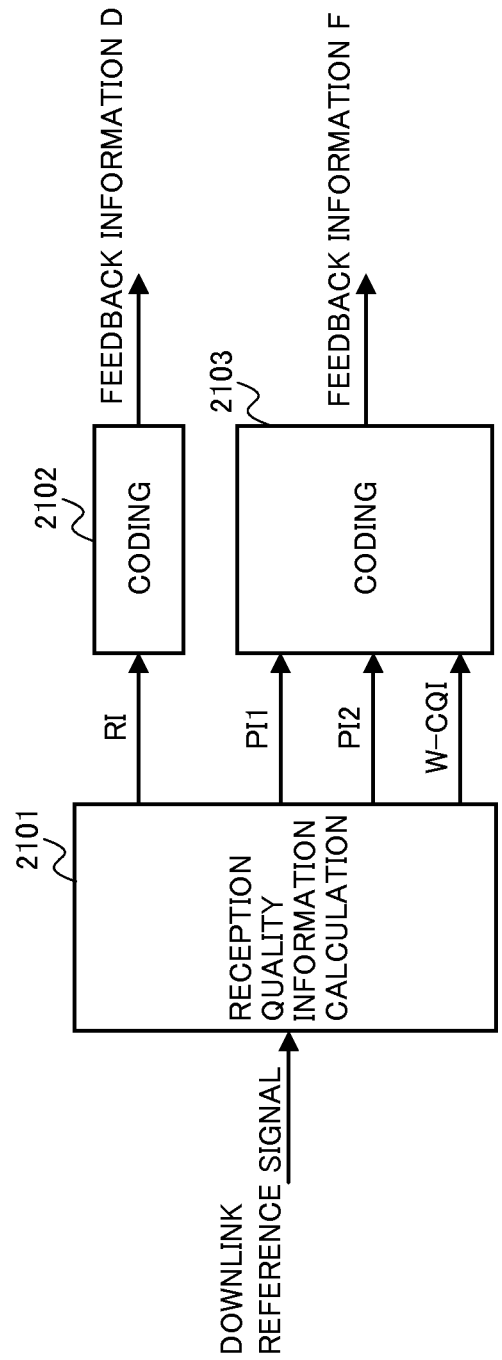
FIG. 21 represents exemplary internal processing at a feedback information generation unit according to a third embodiment of the present invention.

FIG. 21 represents exemplary internal processing (process) at feedback information generation unit 507 according to the present embodiment. This processing is the internal processing at feedback information generation unit 507 in the second feedback mode. The internal processing at feedback information generation unit 507 includes reception quality information calculation processing 2101 calculating RI, PI1, PI2, and W-CQI using the downlink reference signal, coding processing 2102 calculating feedback information D (the third feedback information) using RI, and coding processing 2103 calculating feedback information F (the sixth feedback information) using PI1, PI2, and W-CQI. Here, reception quality information calculation processing 2101 and coding processing 2102 are identical to reception quality information calculation processing 1101 in FIG. 11 and coding processing 1702 in FIG. 17, respectively.

In coding processing 1703, 2 bits of PI1, 4 bits of PI2, and 4 or 7 bits of W-CQI are coupled and the coupled bit sequence is subjected to error correction coding to generate feedback information F as a coded bit sequence. However, the number of bits of the coded bit sequence may be different from that in the first feedback mode.

Figure 22:
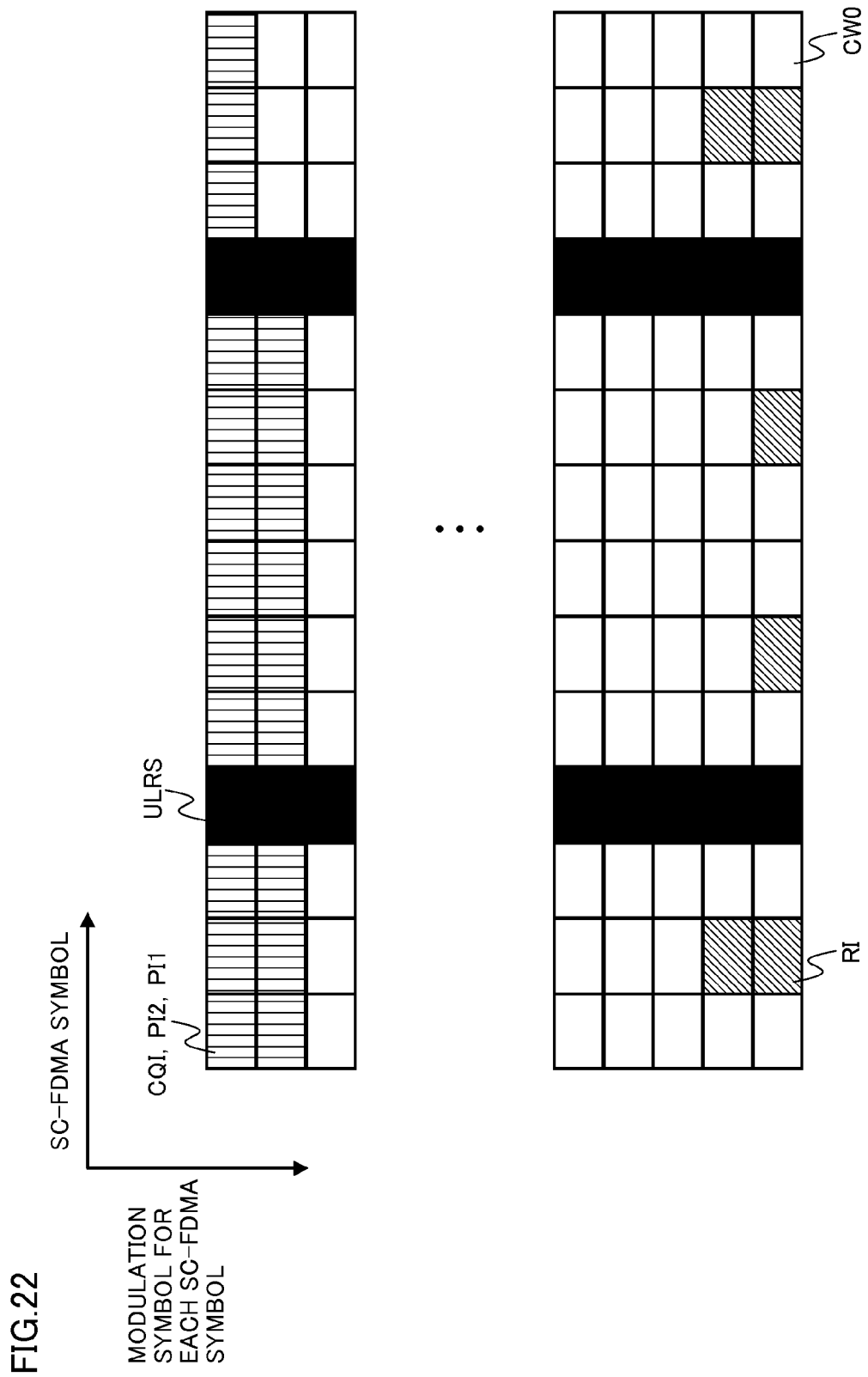
FIG. 22 represents exemplary rearrangement and mapping of a symbol sequence according to the third embodiment of the present invention.

FIG. 22 represents exemplary rearrangement and mapping of a symbol sequence according to the present embodiment. The rearrangement and mapping shown in FIG. 22 illustrate the case where one CW (CW0) is transmitted in the uplink in the second feedback mode. ULRS is mapped to the fourth and eleventh SC-FDMA symbols. Feedback information D having coded RI and feedback information F having coded PI1, PI2, and CQI are rearranged as shown in FIG. 22.

More specifically, feedback information F is first coupled to CW0. On this occasion, they are coupled in the order of feedback information F and CW0. Thereafter, the coupled symbol sequence is rearranged, from the beginning of the sequence, to be sequentially mapped from the front of each SC-FDMA symbol. Feedback information D is rearranged to be mapped to some or all of the SC-FDMA symbols close to ULRS (for example, the rear of the second, sixth, ninth, and thirteenth SC-FDMA symbols as shown in FIG. 22).

Figure 23:
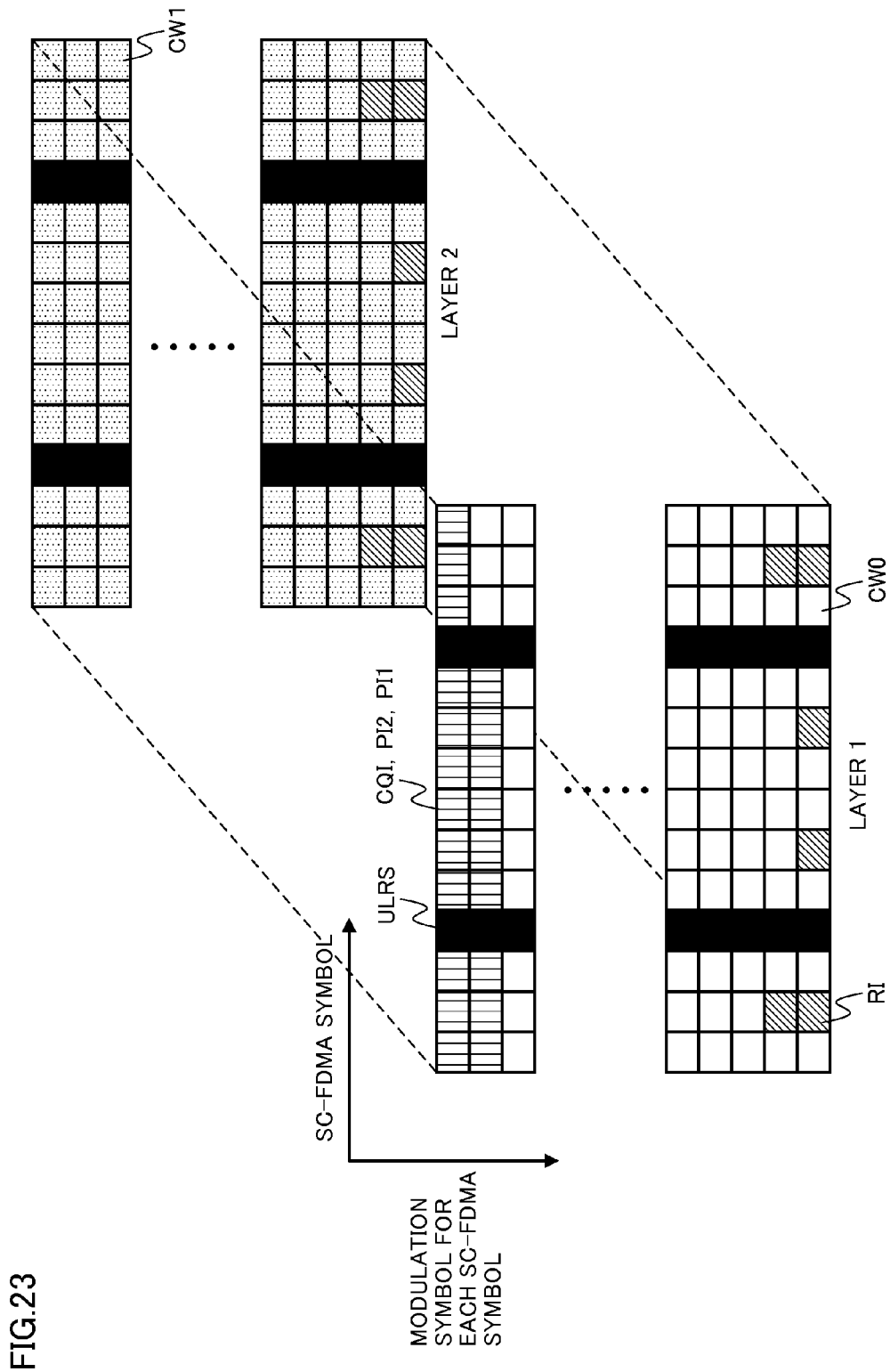
FIG. 23 represents another exemplary rearrangement and mapping of the symbol sequence according to the third embodiment of the present invention.

FIG. 23 represents another exemplary rearrangement and mapping of the symbol sequence according to the present embodiment. The rearrangement and mapping shown in FIG. 23 illustrate the case where the plurality of CWs (CW0 and CW1) are transmitted in the uplink in the second feedback mode. ULRS is mapped to the fourth and eleventh SC-FDMA symbols in each layer. Feedback information D and feedback information F are rearranged as shown in FIG. 23.

More specifically, feedback information F is first coupled to CW0. On this occasion, they are coupled in the order of feedback information F and CW0. Thereafter, the coupled symbol sequence is rearranged, from the beginning of the sequence, to be sequentially mapped from the front of each SC-FDMA symbol in the layer in which CW0 is transmitted. On the other hand, CW1 is rearranged, from the beginning of the sequence, to be sequentially mapped from the front of each SC-FDMA symbol in the layer in which CW1 is transmitted. Feedback information D is rearranged to be mapped to some or all of the SC-FDMA symbols close to ULRS in every layer (for example, the rear of the second, sixth, ninth, and thirteenth SC-FDMA symbols in layers 1 and 2 as shown in FIG. 22).

These rearrangement processing and mapping processing are carried out at uplink subframe generation unit 509, under a designation from higher layer 506. On the other hand, feedback information acquisition unit 409 in the base station device carries out demapping corresponding to the mapping at uplink subframe generation unit 509 and rearrangement processing restoring the rearrangement at uplink subframe generation unit 509, under a designation from higher layer 411, to obtain feedback information D and feedback information F. Thereby, since the accuracy of detecting highly important information such as RI can be enhanced, reception quality can be improved. Further, since the diversity effect of information having a large amount of information such as PI2 and CQI can be enhanced, reception quality can be improved.

As described above, in the first feedback mode (periodic feedback mode or mode performing feedback via the physical uplink control channel), the terminal device according to the present embodiment reports the first feedback information (feedback information A or feedback information C) having jointly coded RI and PI1 and the second feedback information (feedback information B) having jointly coded PI2 and CQI, in different subframes. Alternatively, the terminal device according to the present embodiment reports a set of the third feedback information (feedback information D) having coded RI and the fifth feedback information (feedback information E) having coded PI1, and the second feedback information (feedback information B) having jointly coded PI2 and CQI, in different subframes.

On the other hand, in the second feedback mode (aperiodic feedback mode or mode performing feedback via the physical uplink shared channel), the terminal device according to the present embodiment reports the third feedback information and the sixth feedback information (feedback information F) having jointly coded PI1, PI2, and CQI, in the same subframe. Further, in the second feedback mode, the terminal device according to the present embodiment rearranges the fourth feedback information such that the fourth feedback information is mapped to the SC-FDMA symbols located relatively close to ULRS. Thereby, coding is completed within a subframe, and thus the base station device or the terminal device can carry out sequential processing for every subframe. In addition, the amount of processing for every subframe can be reduced. Further, since the accuracy of detecting highly important information such as RI and PI1 can be enhanced, reception quality can be improved. Furthermore, since the diversity effect of information having a large amount of information such as PI2 and CQI can be enhanced, reception quality can be improved.

Further, by switching the unit of coding processing (coding unit) of the reception quality information between the first feedback mode and the second feedback mode, coding performance suitable for each feedback mode can be achieved.

Fourth Embodiment

Each of the above embodiments has been described based on the case where the terminal device reports reception quality information in one cell. A fourth embodiment of the present invention will be described based on the case where the terminal device reports reception quality information in a plurality of cells. The fourth embodiment of the present invention will be described hereinafter with reference to the drawings.

Figure 24:
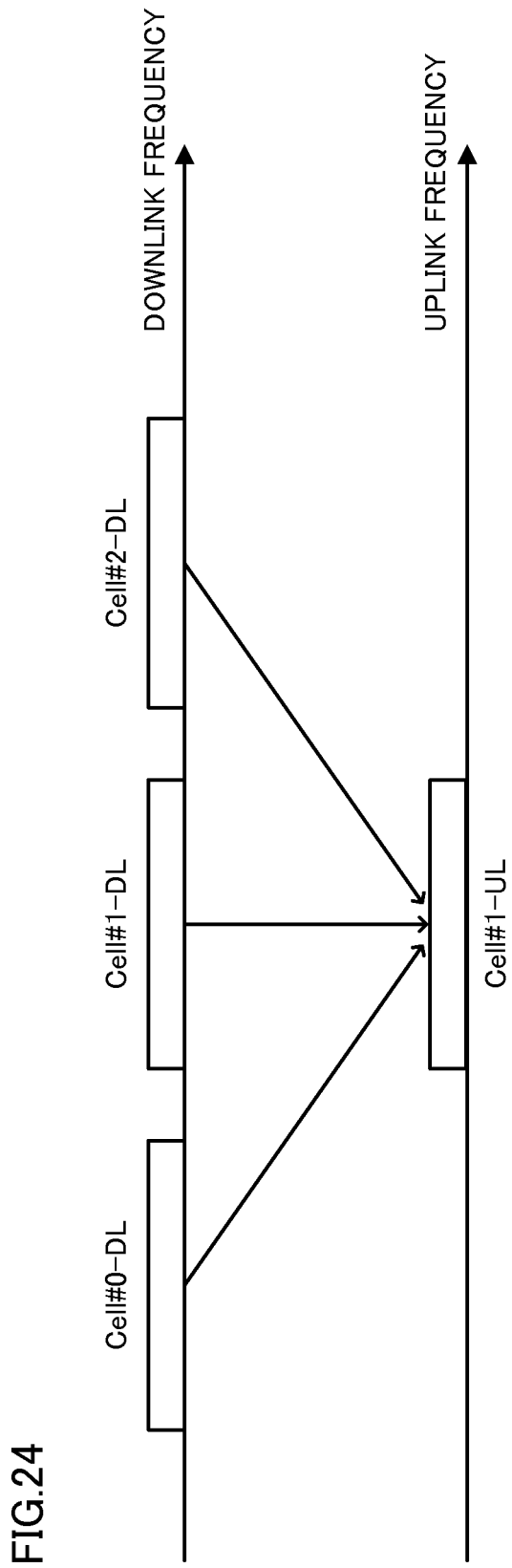
FIG. 24 represents an exemplary cell configuration according to a fourth embodiment of the present invention.

FIG. 24 represents an exemplary cell configuration according to the present embodiment. It is assumed that the terminal device is connected to cells (Cell#0, Cell#1, Cell#2) covered in three downlink component carriers differing from each other. In this state, the terminal device reports the reception quality information in three downlinks (Cell#0-DL, Cell#1-DL, Cell#2-DL) through one uplink (Cell#1-UL).

Figure 25:
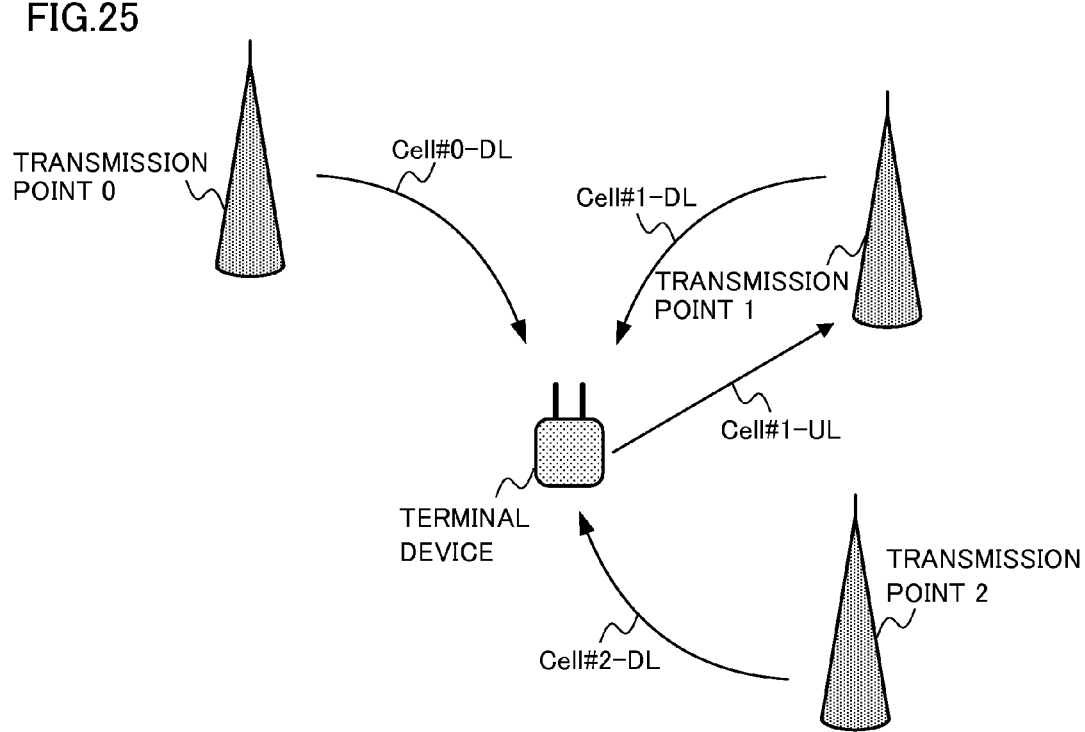
FIG. 25 represents another exemplary cell configuration according to the fourth embodiment of the present invention.
Figure 26:
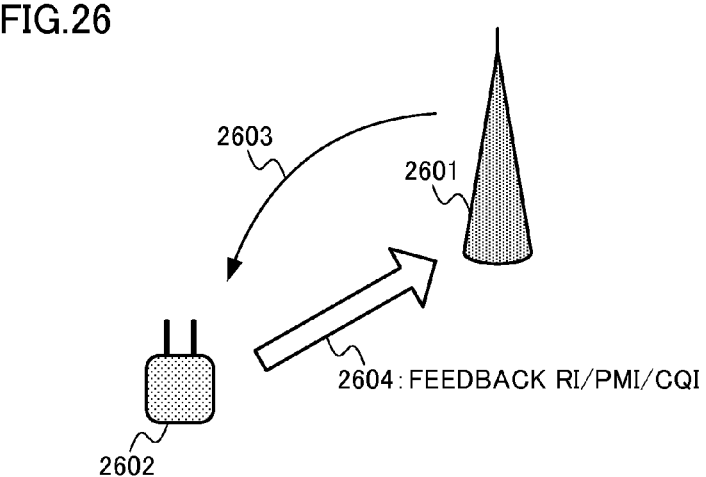
FIG. 26 is a schematic view of a configuration of a communication system.

FIG. 25 represents another exemplary cell configuration according to the present embodiment. It is assumed that the terminal device is connected to cells (Cell#0, Cell#1, Cell#2) covered at three transmission points (transmission point 0, transmission point 1, transmission point 2) differing from each other. In this state, the terminal device reports the reception quality information in three downlinks (Cell#0-DL, Cell#1-DL, Cell#2-DL) through one uplink (Cell#1-UL).

The base station device configures, for the terminal device, a feedback mode in each of Cell#0, Cell#1, and Cell#2. The feedback mode may be individually configured for each cell, or may be configured in common.

When the first feedback mode (periodic feedback mode or mode performing feedback via the physical uplink control channel) is configured in all of Cell#0, Cell#1, and Cell#2, the terminal device reports feedback information having coded RI, PI1 (or PI2), and CQI in each of Cell#0, Cell#1, and Cell#2, in respectively different subframes. On this occasion, the method described in each of the above embodiments can be used to code RI, PI1 (or PI2), and CQI.

On the other hand, when the second feedback mode (aperiodic feedback mode or mode performing feedback via the physical uplink shared channel) is configured in any of Cell#0, Cell#1, and Cell#2, the terminal device reports feedback information having coded RI, PI1 (or PI2), and CQI in each of Cell#0, Cell#1, and Cell#2, in the same subframe.

Here, as the method of rearranging and mapping each feedback information, it is only necessary to first couple feedback information having the same contents among the feedback information in the cells, and then apply arrangement and mapping as described in each of the above embodiments to the coupled feedback information. Thereby, also in the case where the reception quality information in the plurality of cells is reported, coding is completed within a subframe, and thus the base station device or the terminal device can carry out sequential processing for every subframe. In addition, the amount of processing for every subframe can be reduced. Further, since the accuracy of detecting highly important information such as RI and PI1 can be enhanced, reception quality can be improved. Furthermore, since the diversity effect of information having a large amount of information such as PI1, PI2, and CQI can be enhanced, reception quality can be improved.

Although the description has been provided based on the case where the reception quality information in the plurality of cells corresponding to different component carriers or different transmission points is reported, the present invention is not limited thereto. The present invention is also applicable to a plurality of cells defined by a method other than that. In addition, although the description has been provided based on the case where the reception quality information is reported through one uplink, the present invention is not limited thereto. Even in the case where the reception quality information is reported through two or more uplinks, the present invention is applicable by focusing attention on one uplink.

Although each of the above embodiments has been described based on the case where a preferred precoder is reported to the base station, the precoding processing in the base station can be carried out efficiently by using similar processing even for reporting a precoder not preferred. In this case, for example, it is possible to use a method of selecting a precoder such that the reception signal power is reduced, from the code book, taking the propagation path into account.

The processing of each unit may be carried out by storing a program for realizing all or some of the functions of the base station device and/or all or some of the functions of the terminal device into a computer readable storage medium, and causing a computer system to read out and execute the program stored in the storage medium. The "computer system" referred to herein includes an OS and hardware such as peripheral equipment.

Further, the "computer system" also includes a home page presenting environment (or display environment), when utilizing a WWW system.

Furthermore, the "computer readable storage medium" refers to a storage device such as a portable medium including a flexible disk, magneto optical disk, ROM, CD-ROM, and also a hard disk or the like incorporated in a computer system.

Furthermore, the "computer readable storage medium" is a medium that retains a program dynamically for a short period of time like a communication line when a program is to be transmitted via a network such as the Internet or a communication line such as the telephone line, and a medium that retains a program for a predetermined period of time like a volatile memory in a computer system functioning as a server or client in such a case. Moreover, the aforementioned program may be directed to realizing the aforementioned function partially, or realizing the aforementioned function by being combined with a program already stored in the computer system.

Furthermore, all or some of the functions of the base station device and/or all or some of the functions of the terminal device may be integrated in an integrated circuit to be realized. Each functional block of the base station device and/or terminal device may be provided individually as a chip, or some or all of the functional blocks may be integrated as a chip. The scheme of achieving an integrated circuit is not limited to LSI (Large Scale Integration), and may be realized by a dedicated circuit or general purpose processor. Furthermore, when development in the semiconductor art sees the approach of achieving an integrated circuit replacing an LSI, an integrated circuit by such approach may be employed.

Although the embodiments of the present invention have been described in detail with reference to the drawings, it is to be understood that the specific configuration is not limited to these embodiments, and is intended to include any design change or the like within the scope not departing from the gist of the present invention.

REFERENCE SIGNS LIST 101, 2601: base station; 102, 2602: terminal device; 103, 2603: downlink transmission signal; 104, 2604: uplink channel; 401: downlink subframe generation unit; 402: physical downlink control channel generation unit; 403: downlink reference signal generation unit; 404: OFDM signal transmission unit; 405, 512: transmission antenna; 406, 501: reception antenna; 407: SC-FDMA signal reception unit; 408: filter; 409: feedback information acquisition unit; 410: code word processing unit; 411, 506: higher layer; 502: OFDM signal reception unit; 503: downlink subframe processing unit; 504: downlink reference signal acquisition unit; 505: physical downlink control channel acquisition unit; 507: feedback information generation unit; 508: code word generation unit; 509: uplink subframe generation unit; 510: uplink reference signal generation unit; 511: SC-FDMA signal transmission unit; 1204: (RI, PI1) table.

The invention claimed is:

1. A terminal device that reports information about reception quality to a base station device based on a first feedback mode in which the terminal device periodically reports the information and a second feedback mode in which the terminal device aperiodically reports the information, comprising:

generation circuitry that generates a rank indicator specifying a rank, first partial precoder information and second partial precoder information specifying a precoder, and a reception quality indicator specifying a transmission rate, as the information about the reception quality, in each of the first feedback mode and the second feedback mode; and communication circuitry that carries out communication with the base station device, wherein, in the first feedback mode, the communication circuitry reports the second partial precoder information and the reception quality indicator in a first subframe, and reports the rank indicator and the first partial precoder information but not the second partial precoder information in a second subframe which is different from the first subframe, in the second feedback mode, the communication circuitry reports the rank indicator, the first partial precoder information, the second partial precoder information, and the reception quality indicator in a same subframe, and for both the first feedback mode and the second feedback mode, the precoder is specified by a combination of the reported first partial precoder information and the reported second partial precoder information, and the first partial precoder information is selected conditioned on the rank specified by the reported rank indicator.

2. The terminal device according to claim 1, wherein the communication circuitry switches a unit of coding processing of the reception quality indicator, between the first feedback mode and the second feedback mode.

3. The terminal device according to claim 1, wherein, in the first feedback mode, the communication circuitry jointly codes the second partial precoder information and the reception quality indicator, and jointly codes the rank indicator and the first partial precoder information.

4. The terminal device according to claim 1, wherein, in the second feedback mode, the communication circuitry jointly codes the first partial precoder information, the second partial precoder information, and the reception quality indicator.

5. The terminal device according to claim 2, wherein, in the second feedback mode, the communication circuitry jointly codes the first partial precoder information, the second partial precoder information, and the reception quality indicator.

6. The terminal device according to claim 3, wherein, in the second feedback mode, the communication circuitry jointly codes the first partial precoder information, the second partial precoder information, and the reception quality indicator.

7. A base station device comprising:
higher layer circuitry that configures, for a terminal device, a first feedback mode in which the terminal device periodically reports information about reception quality in the terminal device, and a second feedback mode in which the terminal device aperiodically reports the information; and
reception circuitry that receives the information;
wherein, in receiving a rank indicator specifying a rank, first partial precoder information and second partial precoder information specifying a precoder, and a reception quality indicator specifying a transmission rate, as the information about the reception quality, from the terminal device in each of the first feedback mode and the second feedback mode,
in a case that the higher layer circuitry configures the first feedback mode, the reception circuitry receives, from the terminal device, the second partial precoder information and the reception quality indicator in a first subframe, and receives the rank indicator and the first partial precoder information but not the second partial precoder information in a second subframe which is different from the first subframe,
in a case that the higher layer circuitry configures the second feedback mode, the reception circuitry receives, from the terminal device, the rank indicator, the first partial precoder information, the second partial precoder information, and the reception quality indicator in a same subframe, and
for both the first feedback mode and the second feedback mode, the precoder is specified by a combination of the reported first partial precoder information and the reported second partial precoder information, and the first partial precoder information is selected conditioned on the rank specified by the reported rank indicator.

8. The base station device according to claim 7, further comprising acquisition circuitry that acquires information from the terminal device,
wherein, in a case that the first feedback mode is configured, the acquisition circuitry acquires the second partial precoder information and the reception quality indicator at first timing, and acquires the rank indicator and the first partial precoder information at second timing, and
in a case that the second feedback mode is configured, the acquisition circuitry simultaneously acquires the rank indicator, the first partial precoder information, the second partial precoder information, and the reception quality indicator.

9. The base station device according to claim 7, wherein the base station device switches a unit of decoding processing, between the first feedback mode and the second feedback mode.

10. A communication system, comprising:
a base station device; and
a terminal device for carrying out communication with the base station device,
wherein the base station device includes higher layer circuitry that configures, for the terminal device, a first feedback mode in which the terminal device periodically reports information about reception quality in the terminal device, and a second feedback mode in which the terminal device aperiodically reports the information, and reception circuitry that receives the information; and
in receiving a rank indicator specifying a rank, first partial precoder information and second partial precoder information specifying a precoder, and a reception quality indicator specifying a transmission rate, as the information about the reception quality, from the terminal device in each of the first feedback mode and the second feedback mode,
in a case that the higher layer circuitry configures the first feedback mode, the reception circuitry receives, from the terminal device, the second partial precoder information and the reception quality indicator in a first subframe, and receives the rank indicator and the first partial precoder information but not the second partial precoder information in a second subframe different from the first subframe, and
in the first feedback mode, the terminal device reports the second partial precoder information and the reception quality indicator in the first subframe, and report the rank indicator and the first partial precoder information but not the second partial precoder information in the second subframe which is different from the first subframe,
in the second feedback mode, the terminal device reports the rank indicator, the first partial precoder information, the second partial precoder information, and the reception quality indicator in a same subframe, and
for both the first feedback mode and the second feedback mode, the precoder is specified by a combination of the reported first partial precoder information and the reported second partial precoder information, and the first partial precoder information is selected conditioned on the rank specified by the reported rank indicator.

11. A processing method in a terminal device, comprising:
generating, in a case that the terminal device reports information about reception quality to a base station device based on a first feedback mode in which the terminal device periodically reports the information and a second feedback mode in which the terminal device aperiodically reports the information, a rank indicator specifying a rank, first partial precoder information and second partial precoder information specifying a precoder, and a reception quality indicator specifying a transmission rate, as the information about the reception quality, in each of the first feedback mode and the second feedback mode, the precoder being specified by a combination of the first partial precoder information and the second partial precoder information;
in the first feedback mode, reporting the second partial precoder information and the reception quality indicator in a first subframe, and reporting the rank indicator and the first partial precoder information but not the second partial precoder information in a second subframe which is different from the first subframe;

in the second feedback mode, reporting the rank indicator, the first partial precoder information, the second partial precoder information, and the reception quality indicator in a same subframe; and for both the first feedback mode and the second feedback mode, the precoder is specified by a combination of the reported first partial precoder information and the reported second partial precoder information, and the first partial precoder information is selected conditioned on the rank specified by the reported rank indicator.

12. A processing method in a base station device, the base station device receiving information about reception quality in a terminal device;

the base station device configuring, for the terminal device, a first feedback mode in which the terminal device periodically reports the information about reception quality in the terminal device, and a second feedback mode in which the terminal device aperiodically reports the information, in receiving a rank indicator specifying a rank, first partial precoder information and second partial precoder information specifying a precoder, and a reception quality indicator specifying a transmission rate, as the information about the reception quality, from the terminal device in each of the first feedback mode and the second feedback mode, the processing method comprising:

in a case that the base station device configures the first feedback mode, receiving, from the terminal device, the second partial precoder information and the reception quality indicator in a first subframe, and receiving the rank indicator and the first partial precoder information but not the second partial precoder information in a second subframe which is different from the first subframe;

in a case that the base station device configures the second feedback mode, receiving, from the terminal device, the rank indicator, the first partial precoder information, the second partial precoder information, and the reception quality indicator in a same subframe; and for both the first feedback mode and the second feedback mode, the precoder is specified by a combination of the reported first partial precoder information and the reported second partial precoder information, and the first partial precoder information is selected conditioned on the rank specified by the reported rank indicator.

13. A terminal device that reports information about reception quality based on a first feedback mode in which the terminal device periodically reports the information and a second feedback mode in which the terminal device aperiodically reports the information and has a larger transmission capacity of information than that of the first feedback mode, comprising:

generation circuitry generates a rank indicator specifying a rank, first partial precoder information and second partial precoder information specifying a precoder, and a reception quality indicator specifying a transmission rate, as the information about the reception quality, in each of the first feedback mode and the second feedback mode; and communication circuitry carries out communication with a base station device, wherein the precoder is specified by a combination of the first partial precoder information and the second partial precoder information, in the first feedback mode, the communication circuitry codes the first partial precoder information together with the rank indicator and transmit them, in the second feedback mode, the communication circuitry codes the first partial precoder information together with the second partial precoder information and the reception quality indicator and transmit them, and for both the first feedback mode and the second feedback mode, the precoder is specified by a combination of the reported first partial precoder information and the reported second partial precoder information, and the first partial precoder information is selected conditioned on the rank specified by the reported rank indicator.

14. A processing method in a terminal device, the terminal device reporting information about reception quality to a base station device based on a first feedback mode in which the terminal device periodically reports the information and a second feedback mode in which the terminal device aperiodically reports the information and has a larger transmission capacity of information than that of the first feedback mode, the processing method comprising:

generating a rank indicator specifying a rank, first partial precoder information and second partial precoder information specifying a precoder, and a reception quality indicator specifying a transmission rate, as the information about the reception quality, in each of the first feedback mode and the second feedback mode, the precoder being specified by a combination of the first partial precoder information and the second partial precoder information;

in the first feedback mode, coding the first partial precoder information together with the rank indicator and transmitting them;

in the second feedback mode, coding the first partial precoder information together with the second partial precoder information and the reception quality indicator and transmitting them; and for both the first feedback mode and the second feedback mode, the precoder is specified by a combination of the reported first partial precoder information and the reported second partial precoder information, and the first partial precoder information is selected conditioned on the rank specified by the reported rank indicator.

15. A base station device comprising:

higher layer circuitry that configures, for a terminal device, a first feedback mode in which the terminal device periodically reports information about reception quality in the terminal device, and a second feedback mode in which the terminal device aperiodically reports the information; and reception circuitry that receives the information;

wherein, in receiving a rank indicator specifying a rank, first partial precoder information and second partial precoder information specifying a precoder, and a reception quality indicator specifying a transmission rate, as the information about the reception quality, from the terminal device in each of the first feedback mode and the second feedback mode, in the first feedback mode, the reception circuitry receives the first partial precoder information jointly coded with the rank indicator but not with the second partial precoder information, in the second feedback mode, the reception circuitry receives the first partial precoder information jointly coded with the second partial precoder information and the reception quality indicator, and for both the first feedback mode and the second feedback mode, the precoder is specified by a combination of the reported first partial precoder information and the reported second partial precoder information, and the first partial precoder information is selected conditioned on the rank specified by the reported rank indicator.

16. A processing method in a base station device, the base station device receiving information about reception quality in a terminal device;

the base station device configuring, for the terminal device, a first feedback mode in which the terminal device periodically reports the information about reception quality in the terminal device, and a second feedback mode in which the terminal device aperiodically reports the information, in a case that the base station device receives a rank indicator specifying a rank, first partial precoder information and second partial precoder information specifying a precoder, and a reception quality indicator specifying a transmission rate, as the information about the reception quality, from the terminal device in each of the first feedback mode and the second feedback mode, the processing method comprising:

in the first feedback mode, receiving the first partial precoder information jointly coded with the rank indicator but not with the second partial precoder information;

in the second feedback mode, receiving the first partial precoder information jointly coded with the second partial precoder information and the reception quality indicator; and for both the first feedback mode and the second feedback mode, the precoder is specified by a combination of the reported first partial precoder information and the reported second partial precoder information, and the first partial precoder information is selected conditioned on the rank specified by the reported rank indicator.

* * * * *